United States Patent
Hamabe

(10) Patent No.: US 6,574,456 B2
(45) Date of Patent: Jun. 3, 2003

(54) METHOD OF PREVENTING INTERFERENCE OF ADJACENT FREQUENCIES IN A CELLULAR SYSTEM BY SELECTION BETWEEN ADJACENT CARRIER FREQUENCY AND NON-ADJACENT CARRIER FREQUENCY

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/280,117

(22) Filed: Mar. 26, 1999

(65) Prior Publication Data

US 2002/0111163 A1 Aug. 15, 2002

(30) Foreign Application Priority Data

Mar. 27, 1998 (JP) ............................................. 10-081863
Jan. 21, 1999 (JP) ............................................. 11-013237

(51) Int. Cl.[7] ........................ H04B 15/00; H04Q 7/20
(52) U.S. Cl. ........................ 455/63; 455/62; 455/448; 455/437; 455/441; 455/443; 455/444; 455/452; 370/335; 370/331
(58) Field of Search ...................... 455/62, 63, 448, 455/452, 451, 450, 434, 446, 437, 438, 440, 441, 443, 444, 447, 454, FOR 103; 370/329, 335, 331, 332

(56) References Cited

U.S. PATENT DOCUMENTS

| | | | | |
|---|---|---|---|---|
| 4,965,850 A | * | 10/1990 | Schloemer | 455/450 |
| 5,341,397 A | | 8/1994 | Gudmundson | 370/335 |
| 5,491,837 A | * | 2/1996 | Haartsen | 455/62 |
| 5,551,064 A | * | 8/1996 | Nobbe et al. | 455/62 |
| 5,594,946 A | * | 1/1997 | Menich et al. | 455/63 |
| 5,649,303 A | * | 7/1997 | Hess et al. | 455/63 |
| 5,794,157 A | * | 8/1998 | Haartsen | 455/63 |
| 5,822,699 A | * | 10/1998 | Kotzin et al. | 455/62 |
| 5,845,209 A | * | 12/1998 | Iwata | 455/63 |
| 5,873,047 A | * | 2/1999 | Nakano et al. | 455/452 |
| 5,884,145 A | * | 3/1999 | Haartsen | 455/63 |
| 5,913,168 A | * | 6/1999 | Moreau et al. | 455/441 |
| 6,009,332 A | * | 12/1999 | Haartsen | 455/450 |
| 6,052,605 A | * | 4/2000 | Meredith et al. | 455/63 |

FOREIGN PATENT DOCUMENTS

| | | | | |
|---|---|---|---|---|
| JP | 3-174827 | 7/1991 | | H04B/7/26 |
| JP | 4-3535 | 1/1992 | | H04Q/7/36 |
| JP | 6-69862 | 3/1994 | | H04B/7/26 |
| JP | 7-111676 | 4/1995 | | H04Q/7/36 |
| JP | 8-280064 | 10/1996 | | H04Q/7/36 |
| WO | WO 98/09466 A1 | 3/1998 | | H04Q/7/36 |

* cited by examiner

*Primary Examiner*—William Trost
*Assistant Examiner*—Rafael Perez-Gutierrez
(74) *Attorney, Agent, or Firm*—Scully, Scott, Murphy & Presser

(57) ABSTRACT

A method of preventing interference of adjacent frequencies which selects and uses a carrier frequency which is not adjacent to another carrier frequency is disclosed. A cellular system A is composed of a plurality of base stations and a mobile station, and a cellular system B is composed of a plurality of other base stations and another mobile station. For cellular system A, a carrier frequency adjacent to a carrier frequency used in cellular system B and a carrier frequency not adjacent thereto are determined. If a received power of a perch channel sent by a base station of cellular system B is larger than a threshold value, the mobile station uses the carrier frequency which is not adjacent to carrier frequency used in cellular system B.

7 Claims, 20 Drawing Sheets

METHOD OF PREVENTING INTERFERENCE OF ADJACENT FREQUENCIES IN A CELLULAR SYSTEM BY SELECTION BETWEEN ADJACENT CARRIER FREQUENCY AND NON-ADJACENT CARRIER FREQUENCY

BACKGROUND OF THE INVENTION

1. Field of the Invention

The present invention relates to a method of preventing interference of adjacent frequencies in a cellular system, and more particularly to a method of preventing interference of adjacent frequencies in a cellular system that may be caused by adjacent carrier frequencies for uplink channels used by the independent cellular systems.

2. Description of the Related Art

In general, a specified frequency band is allocated to a cellular system, and a plurality of carrier frequencies which different frequencies are predetermined within this frequency band. A mobile station establishes a channel between itself and a base station in a service area using the carrier frequencies to perform two-way communication therebetween. The base station and the mobile station are designed so as to control leakage power into frequency bands adjacent to both sides of the used carrier frequency as little as possible. However, the leakage power can not be fully suppressed, so that an interference signal power is supplied to a signal of an adjacent frequency at predetermined rate. In one cellular system, each of the mobile stations establishes a channel between itself and the base station closest to it to perform communication. In an uplink channel which is a channel established from a mobile station to a base station, the transmission power of the uplink channel for transmitting a signal from the mobile station to the base station is controlled such that the difference between received powers of the signals from the mobile station, received by the base station may not be large. For this reason, an interference signal power supplied from a signal of an adjacent frequency becomes smaller than a desired signal power. On the other hand, in a downlink channel which is a channel established from a base station to a mobile station, if a transmission power of the base station is constant, an interference signal power from signals transmitted on a frequency adjacent to that of a desired wave signal reaches the mobile station through the same transmission path to be attenuated similarly. Accordingly, the interference signal power from the signal having a frequency adjacent to that of the desired wave signal is smaller than the desired signal power. Thus, in one cellular system, such interference of adjacent frequencies may not pose a serious problem.

However, the interference of adjacent frequencies may pose a serious problem when another cellular system having an allocated frequency band adjacent to the frequency band of the particular cellular system establishes a base station in the same service area and communicates with a mobile station.

As shown in FIG. 1, for example, when mobile station 221 located near base station 261 belonging to the other cellular system establishes a channel and communicates with base station 211, it sends a signal with a power sufficiently large for reception to base station 211 remote from mobile station 221, so that the signal is also received with a large power by base station 261. When mobile station 271 establishing a channel with base station 261 controls the transmission power so that the received power is not too large at base station 261, only the received signal from mobile station 221 may be exceedingly large. At this time, when a signal of a carrier frequency adjacent to a carrier frequency used for the transmission of mobile station 221, is used for the transmission by mobile station 271 the interference of adjacent frequencies of the transmitted signal of mobile station 221 will be large at base station 261, thereby deteriorating a receiving quality of the signal from mobile station 271.

One of solutions to such a problem is to make an interval between carrier frequencies used in different cellular systems wider than that between the carrier frequencies used in the same cellular system. Because the spacing between the carrier frequencies among the cellular systems becomes wider, this solution is disadvantageous in reducing utilization efficiency of frequency bands. However, in a cellular system using many narrow band signals, the spacing between the carrier frequencies is small as compared with the total of the frequency band, so that the reduction in the utilization efficiency is not so serious. On the other hand, in a cellular system in which a small number of wide band signals in the same frequency band are used, the spacing between the frequency bands is large as compared with the total of the frequency bands, thus significantly reducing the utilization efficiency.

An approach to prevent interference between the cellular systems, has been proposed wherein prior to the start of transmission of an uplink channel by the use of a certain carrier frequency at a mobile station, interference signal power of a carrier frequency of a downlink channel used in conjunction with the carrier frequency of an uplink channel is measured, and when an interference signal power from a carrier frequency of an adjacent frequency is large, a carrier frequency other than that carrier frequency is used. However, in this approach, a certain combination of a carrier frequency of an uplink channel and a carrier frequency of a downlink channel must be used.

Furthermore, in a cellular system which adopts a code division multiple access method (CDMA) as a radio access method, despite a certain combination of carrier frequencies for an uplink channel and carrier frequencies for a downlink channel, signals to be transmitted to many mobile stations are multiplexed onto a signal of one carrier frequency of this reason, a received power of signals transmitted to other mobile stations using the same carrier frequency is received with an interference signal power from a signal of an adjacent carrier frequency mixed. Thus, despite the measurement of the received power, the interference signal power from the adjacent carrier frequency can not be obtained. Accordingly, with this method, it is impossible to prevent the interference from the adjacent carrier frequency.

Furthermore, since a transmitter in the mobile station has typically a simpler construction as compared with the base station, it has sometimes a low suppression of a leakage power into an adjacent carrier frequency. Therefore, when a certain mobile station is located near a base station belonging to another cellular system and the mobile station performs a transmission using adjacent carrier frequencies for an uplink channel as well as for a downlink channel, the mobile station is able to continue the communication with a good quality without being applied with an interference of adjacent frequencies because of a low leakage power from transmitting signals of the base station to the adjacent carrier frequency. However, because of a large leakage power from transmitting signals from the mobile station to an adjacent carrier frequency. A mobile station may cause an one-sided interference obstacle to the base station.

Although such interference of adjacent frequencies presents no problem when starting a communication, it may be a problem during the communication because as a mobile station may approach a base station belonging to another cellular system, as it moves during the communication.

SUMMARY OF THE INVENTION

It is an object of the present invention to provide a method of preventing interference of adjacent frequencies which is capable of preventing a degradation of communication quality due to an interference between carrier frequencies adjacent to each other, without widening the frequency interval of signals used in different cellular systems.

When two cellular systems utilizing frequency bands adjacent to each other for an uplink channel, are provided in a same service area, and a signal for the uplink channel used by a mobile station of one cellular system may cause interference of adjacent frequencies to a mobile station of the other cellular system, the method of preventing an interference of adjacent frequencies in a cellular system according to the present invention is used for preventing an interference to a base station of another cellular system from a signal of an uplink channel used by a mobile station of one cellular system.

To achieve the foregoing object, in the method of preventing interference of adjacent frequencies of a cellular system according to the present invention, a mobile station of the one cellular system measures a received power of transmitting signals transmitted from a base station of the other cellular system present around the mobile station of one cellular system. If the measured value is larger than a threshold value, the mobile station selects and uses a carrier frequency not adjacent to a carrier frequency as a carrier frequency of an uplink channel used in the other cellular system.

The mobile station of one cellular system measures a received power of transmitting signals transmitted from a base station of another cellular system, whereby a amount of the interference of adjacent frequencies given to the base station of the other cellular system by the mobile station of one cellular station is measured. If the interference of adjacent frequencies is larger than a threshold value, it is decided that the amount of the interference of adjacent frequencies received by the base station of the other cellular system exceeds an allowable value. When the mobile station selects a carrier frequency of the uplink channel, the mobile station selects and uses a non-adjacent carrier frequency as the uplink channel, in order to prevent the interference of adjacent frequencies to the base station. As a result, the interference of adjacent frequencies to the base station by the mobile station can be prevented.

Further, according to this embodiment of the present invention, the threshold value is determined based on the amount of suppression of leakage power from an adjacent frequency of the mobile station.

According to another embodiment of the present invention, the threshold value is determined based on a received power of transmitting signals transmitted from a base station of the one cellular system.

According to another embodiment of the present invention, the threshold value is determined based on a difference between a transmission power of transmitting signals transmitted from a base station in which a channel is established with a mobile station, and a transmission power of transmitting signals transmitted from a base station of the other cellular system present around the mobile station.

In another method of preventing interference of adjacent frequencies in a cellular system according to the present invention, when a mobile station of the one cellular system receives a downlink channel continuously, the mobile station preferentially uses a carrier frequency not adjacent to a carrier frequency of a signal of an uplink channel used in the other cellular system. When the mobile station of one cellular system intermittently receives the downlink channel, the mobile station measures a received power of transmitting signals transmitted from a base station of another cellular system present around the mobile station. If the measured value is larger than a threshold value, when the mobile station selects a carrier frequency of a signal of an uplink channel to be used, the mobile station selects and uses a carrier frequency not adjacent to the carrier frequency of the signal for the uplink channel used in the other cellular system.

In another method of preventing interference of adjacent frequencies according to the present invention, the mobile station of one cellular system measures a received power of transmitting signals transmitted from the base station of the other cellular system present around the mobile station, and the mobile station obtains an upper limit value of a transmission power from the measured value, which makes the interference of adjacent frequencies equal to or less than an allowable value. If the upper limit value of the transmission power is equal to or less than the transmission power value at the time of aiming a SIR as a target value, when the mobile station selects a carrier frequency of a signal for the uplink channel, the mobile station selects and uses a carrier frequency which is not adjacent to the carrier frequency of the signal for the uplink channel used in another cellular system.

In another method of preventing interference of adjacent frequencies according to the present invention, the mobile station of one cellular system measures a received power of transmitting signals which is transmitted from the foregoing base station of another cellular system around the mobile station. If the measured value is larger than a first threshold value, when the mobile station selects a carrier frequency of a signal for the uplink channel used, the mobile station selects and uses a carrier frequency which is not adjacent to the carrier frequency of the signal for the uplink channel used in another cellular system. If the measured value is equal to or less than a second threshold value which is smaller than the first threshold value, when the mobile station selects a carrier frequency of a signal of an uplink channel used, the mobile station preferentially uses a carrier frequency adjacent to the carrier frequency of the signal for the uplink channel used in another cellular system.

According to an embodiment of the present invention, the first threshold value is determined based on a difference between a transmission power of transmitting signals which is transmitted from a base station in which a channel is established with a mobile station and a transmission power of transmitting signals which is transmitted from a base station of another cellular system around the foregoing mobile station.

In another method of preventing interference of adjacent frequencies of a cellular system according to the present invention, the mobile station of one cellular system estimates a movement speed. If the movement speed is larger than a certain threshold speed, when the mobile station selects a carrier frequency of a signal of an uplink channel used, the mobile station selects and uses a carrier frequency which is not adjacent to a carrier frequency of a signal for the uplink channel used in another cellular system.

According to another embodiment of the present invention, the mobile station uses information concerning a central frequency of a signal of a downlink channel used by a base station of another cellular system around the mobile station, the information being informed from a base station belonging to the same cellular system of the mobile station, and measures a received power of transmitting signals transmitted from the base station of another cellular system around the mobile station, whereby the received power of the transmitting signal transmitted from the base station is measured.

According to another embodiment of the present invention, the mobile station uses information concerning a central frequency of a signal of a downlink channel that is being used by a base station of another cellular system around the mobile station, the information being previously possessed by the base station, and measures a received power of transmitting signals transmitted from the base station of another cellular system around the mobile station, whereby the mobile station measures the received power of the transmitting signal transmitted from the base station.

In another method of preventing interference of adjacent frequencies of a cellular system according to the present invention, the foregoing mobile station of one cellular system measures a received power of transmitting signals transmitted from a specified base station other than base stations of another cellular system in which a carrier frequency adjacent to a carrier frequency of a signal of an uplink channel used in one cellular system is not determined, among base stations of another cellular system around the foregoing mobile station of one cellular system. If the measured value is larger than a threshold value, when the mobile station selects a carrier frequency of a signal of an uplink channel, the mobile station selects and uses a carrier frequency which is not adjacent to a carrier frequency of a signal of an uplink channel used in another cellular system.

In another method of preventing interference of adjacent frequencies of a cellular system according to the present invention, a mobile station of one cellular system measures a received power of transmitting signals transmitted from a base station of another cellular system. If the measured value is larger than a threshold value, when the mobile station selects a carrier frequency of a signal of a downlink channel used, the mobile station selects and uses a carrier frequency which is not adjacent to a carrier frequency of a signal of a downlink channel used in another cellular system.

According to an embodiment of the present invention, by measuring a received power of a perch channel in transmitting signals transmitted from a base station, the mobile station measures a received power of the transmitting signal transmitted from the base station.

According to another embodiment according to the present invention, in the case where as a carrier frequency of a signal of an uplink channel to be used, the mobile station selects and uses a carrier frequency which is not adjacent to a carrier frequency of a signal of an uplink channel that is being used in another cellular system, the mobile station selects and uses a carrier frequency which is not adjacent to a carrier frequency of a signal of a downlink channel that is being used in another cellular system, as a carrier frequency of a signal of a downlink channel used.

According to another embodiment of the present invention, when a mobile station starts to perform communication with a base station, the mobile station measures a received power of a carrier frequency directed by the base station, and informs the base station of the measurement result of the received power, using a carrier frequency which is not adjacent to a carrier frequency of another cellular system. Upon receipt of the measurement result from the mobile station, if the received power measured is larger than a threshold value, the mobile station selects a non-adjacent frequency. If the received power measured is smaller than the threshold value, the mobile station arbitrarily selects a carrier frequency which can be used, among allocated carrier frequencies.

In another method of preventing interference of adjacent frequencies of a cellular system according to the present invention, a mobile station of one cellular system measures a received power of transmitting signals transmitted from a base station of another cellular system present around the mobile station, and sends the measured value to a base station in which a channel is established with the foregoing mobile station. If the measured value is larger than a threshold value, when the base station selects a carrier frequency of a signal of an uplink channel to be used by the mobile station, the base station to which the measured value is transmitted selects a carrier frequency which is not adjacent to a carrier frequency of a signal of an uplink channel that is being used in another cellular system, and informs the foregoing mobile station of it. Then, the mobile station uses the informed carrier frequency as the uplink channel.

In the present invention, a mobile station of one cellular system measures a received power value of transmitting signals transmitted from a base station of another cellular system, and reports the measurement result to a base station of one cellular system, in which a channel is established with the mobile station of one cellular system, whereby the base station of one cellular system decides a magnitude of an interference of adjacent frequencies which is given to a base station of another cellular system by the mobile station of one cellular system. If the magnitude is larger than a threshold value, the base station of one cellular system decides that the amount of the interference of adjacent frequencies given to the base station of another cellular system from the mobile station of one cellular system is more than an allowable value. When the mobile station selects a carrier frequency of an uplink channel used, the mobile station selects a non-adjacent carrier frequency as uplink channel in order to prevent the interference of adjacent frequencies given to the base station of another cellular system, and the mobile station uses the non-adjacent carrier frequency.

Therefore, the interference of adjacent frequencies which is to be given to the base station of another cellular system by the mobile station of one cellular system can be prevented.

The above and other objects, features and advantages according to the present invention will become apparent from the following description with reference to the accompanying drawings which illustrate examples according to the present invention.

DETAILED DESCRIPTION OF THE PREFERRED EMBODIMENTS

Please note that transmitters of base stations and mobile stations in all of embodiments described below are configured such that a ratio of an interference signal power leaking from a carrier frequency to a carrier frequency adjacent thereto to a radiation power of the carrier frequency may be below a predetermined value.

First Embodiment

Figure 1:
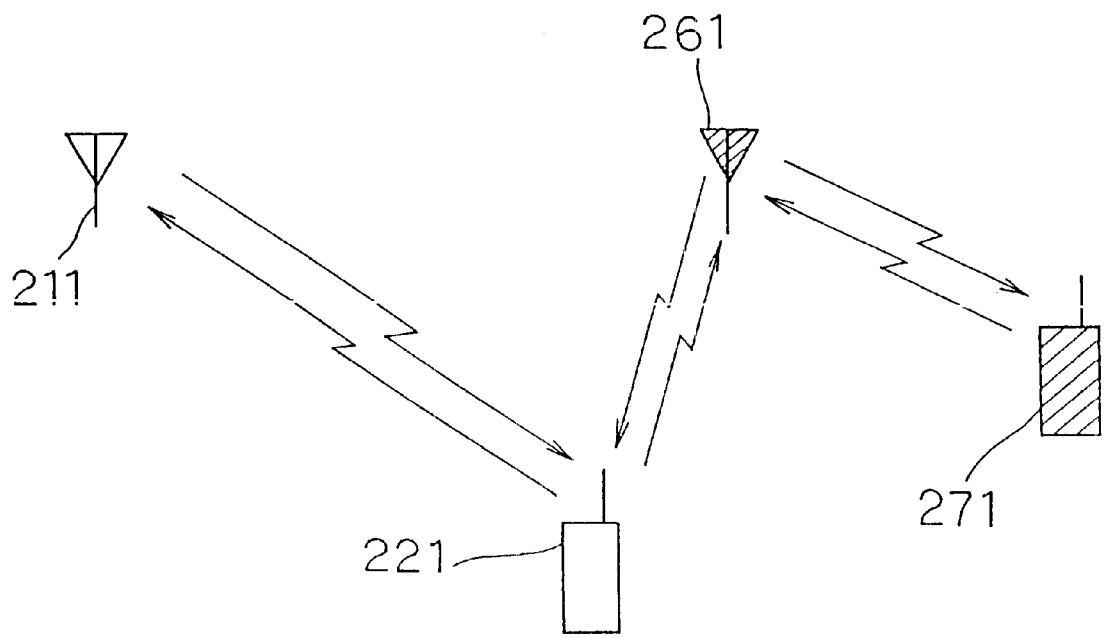
FIG. 1 is an explanatory view of a relationship of transmitting/receiving signal between a base station and a mobile station with an interference of adjacent frequencies.
Figure 2:
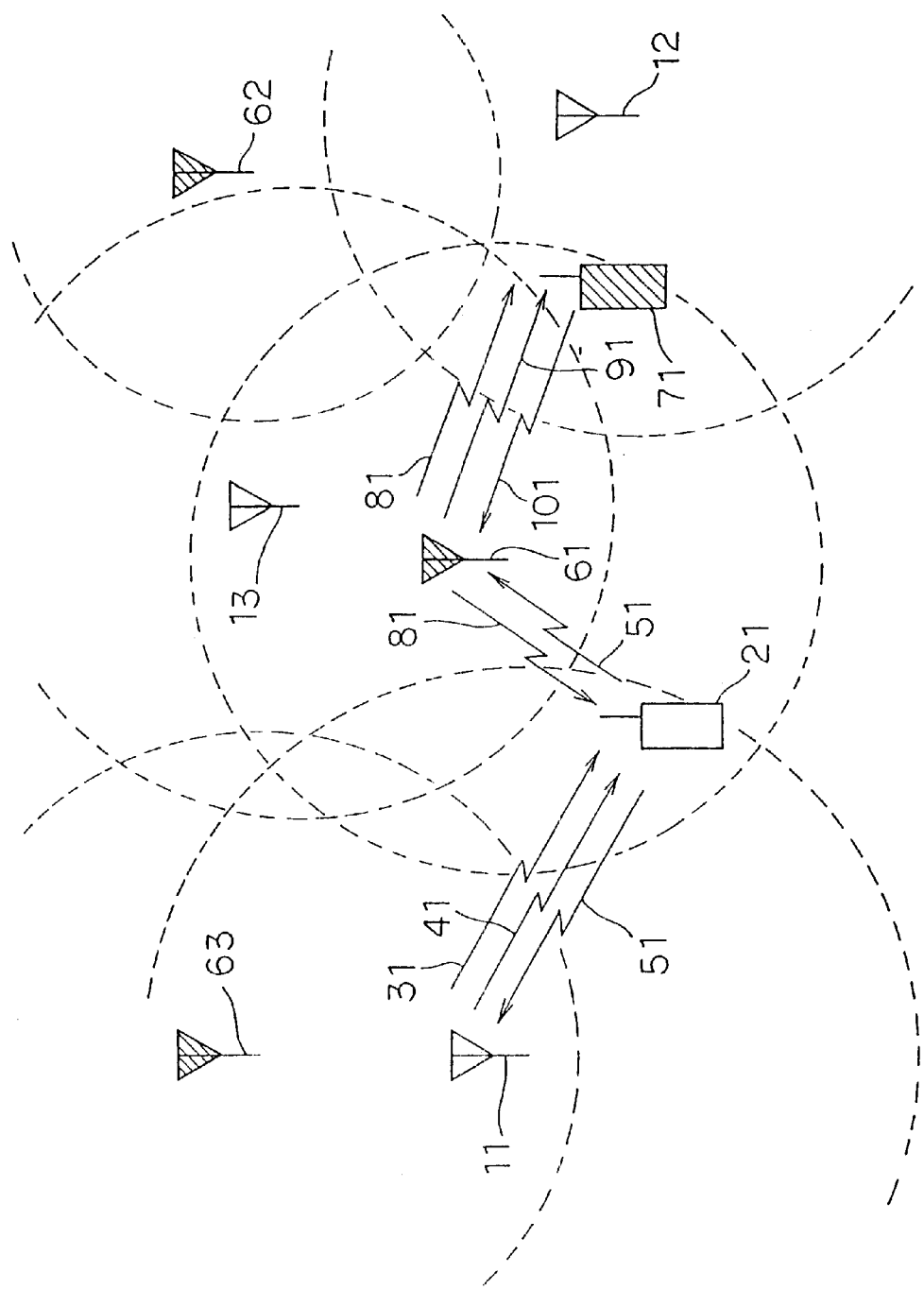
FIG. 2 is a view showing the configuration of a cellular system according to a first embodiment according to the present invention.

Referring to FIG. 2 there is illustrated a cellular system according to a first embodiment of the present invention. In FIG. 2 there are two cellular systems, referred to as cellular system A and cellular system B, respectively. Cellular system A comprised base stations 11–13 in each service area, and a mobile station 21.

Mobile station 21 is positioned within the service area of base station 11. Each base stations 11–13 is connected to a control station (not shown), which in turn is connected to a communication network (not shown). It is to be noted that cellular system A comprises, in addition to base stations, a number of bases stations (not shown) and a number of mobile station (not shown) in each service area.

Similar to cellular system A, cellular system B comprises base station 61–63 in each service area, a mobile station, and control stations.

Cellular system B also comprises additional bases station and additional mobile stations. Cellular system A and cellular B are connected each other via associated networks.

These two cellular systems A, B employ a CDMA method as a radio access method. Wherein a different code is allocated for each channel to multiplex a plurality of channels on one signal, thus enabling communications with one signal between plural base stations and plural mobile stations.

Figure 3:
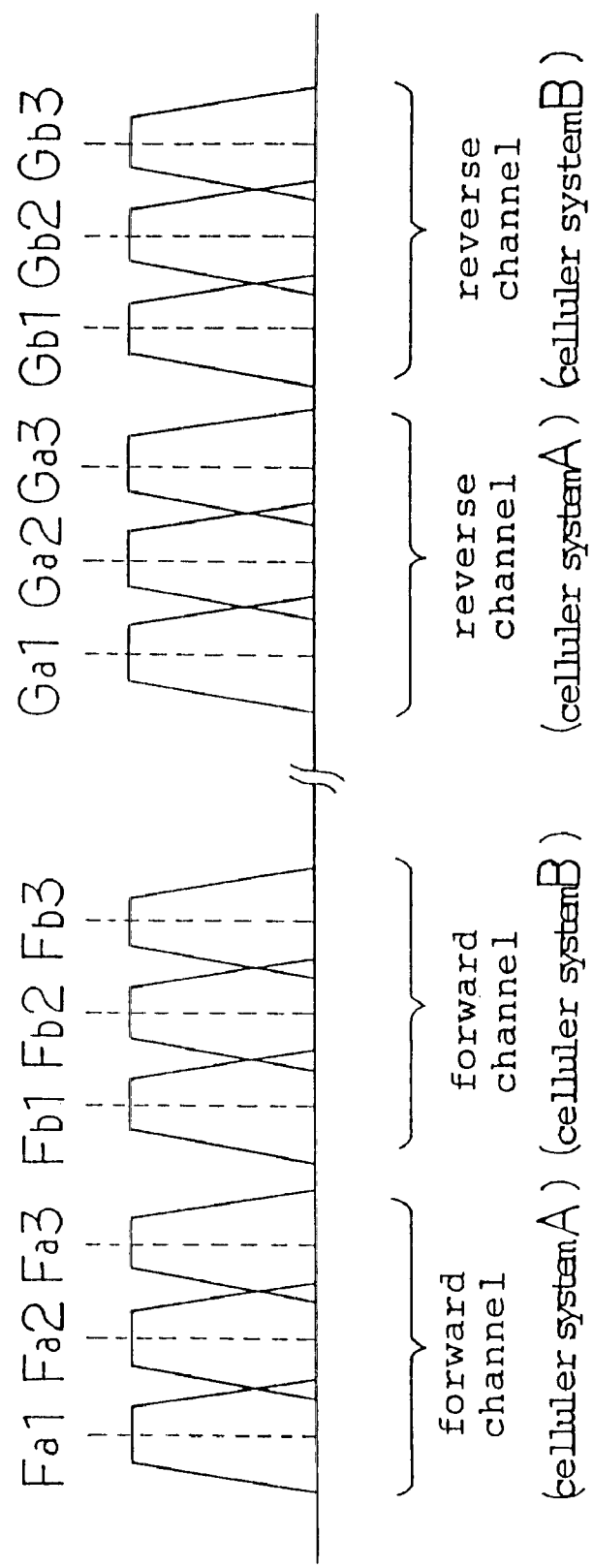
FIG. 3 is an explanatory view of frequency arrangement in the cellular system in FIG. 2.

Referring to FIG. 3 Ga1 to Ga3 carrier frequencies Fa1 to Fa3 and Ga1 to Ga3 are allocated to cellular system A as signals for uplink channel and downlink channel, respectively, while, carrier frequencies Fb1 to Fb3 and Gb1 to G3 are allocated to cellular system B as signals for the uplink channel and downlink channel, respectively.

Carrier frequency Fa3 of the uplink channel in cellular system A is adjacent to carrier frequency Fb1 of the uplink channel in cellular system B, and carrier frequency Ga3 of the downlink channel in cellular system A is adjacent to carrier frequency Gb1 of the downlink channel in cellular system B.

Each of the cellular systems is designed in such manner that part or all of the frequencies allocated thereto are used in the respective base stations.

Base stations 11 to 13 and base stations 61 to 63 transmit a perch channel in each of the signals of the downlink channels that are being used by the respective base stations. A perch channel is a channel which serves to transmit various kinds of base station information for connecting a channel from the base station to the mobile station. The mobile station first acquires the base station information from the perch channel when connecting a channel with the base station. The transmission power on an ordinary channel varies, whereas transmission power on a perch channel is invariable. The power of this perch channel is large compared to that of an ordinary channel.

In FIG. 2, only perch channel 31 transmitted from base station 11 and perch channel 81 transmitted from base station 61 are illustrated, and perch channels transmitted from base stations 12 and 13 and base stations 62 and 63 are omitted.

Each of mobile stations 21 and 71 include a measurement instrument (not shown) for measuring a received power of the perch channel. Mobile station 21 measures the received power of the perch channel of the base station in cellular system A, which is around mobile station 21, including perch channel 31, and mobile station 71 measures the received power of the perch channel of the base station in cellular system B which is around mobile station 71, including perch channel 81. Further, mobile station 21 measures the received power of the transmitting signal of the base stations in cellular system B, and mobile station 71 measures the received power of the transmitting signal of the base stations in cellular system A. At this time, by measuring the received power of the perch channel, each of mobile stations 21 and 71 measures the received power of the transmitting signal of the base stations.

Mobile stations 21 and 71 usually receive the communication channel for the downlink channel continuously. However, when there is an idle-time in the transmission of the downlink channel, the mobile stations 21 and 71 intermittently receive the communication channel of the downlink channel. When mobile station 21 intermittently receives communication channel 41, mobile station 21 measures the received power of the perch channel of base stations 61 to 63 in cellular system B using the idle-time when the communication channel is not received. Mobile station 71 also measures the received power of the perch channel of base stations 11 to 13 in cellular system A using the idle-time similarly.

Figure 4:
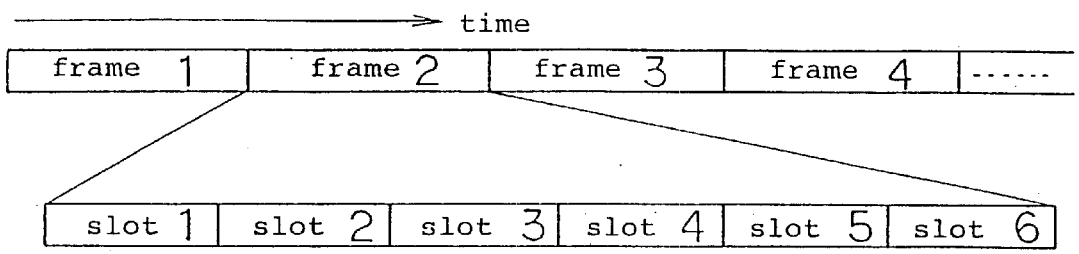
FIG. 4 is a diagram showing a frame structure.

Each of the mobile stations switches over the measurement instruments for the measurement of the received power of the perch channel for a short period of time in unit of slot as shown in FIG. 4, to measure the received down the perch channels of the plural base stations once for each frame.

Since one frame of 10 ms is composed of six slots in the example shown in FIG. 4, it is possible to perform the measurement for up to six base stations. Thus, the mobile station measures the plural perch channels concurrently.

Figure 5:
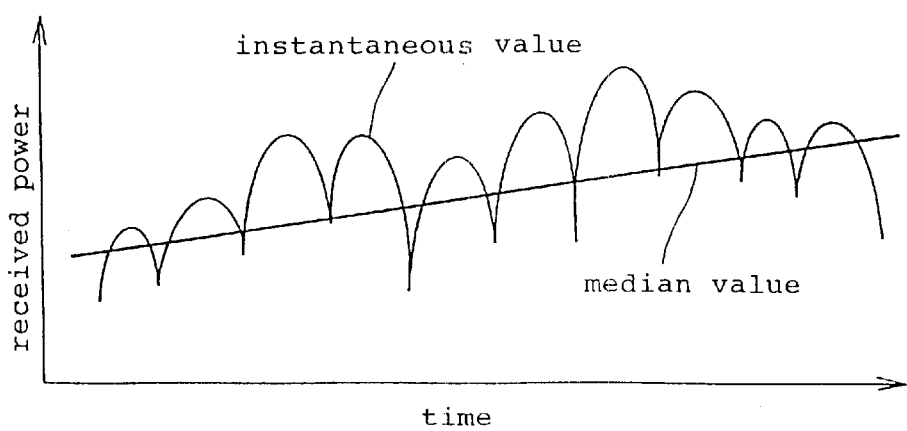
FIG. 5 is a diagram showing a variation in a received power due to phasing.

When a mobile station moves, the instantaneous value of the received power of the perch channel varies in a short cycle with time as shown in FIG. 5. A mobile station measures a received power for the frames by the number corresponding to a sufficiently long time as compared with the cycle the variation in the instantaneous value of the received power at the time the mobile station moves, and obtains the median of the measurement value in these slots.

When starting to perform communication, a mobile station establish a channel between itself and a base station whose median of the received power of the perch channel is at a maximum. During the communication, with the movement of the mobile station, the received power of the perch channel varies. When the base station whose median of the received power of the perch channel is at a maximum the mobile station performs an inter-base station handover for changing a base station in which a channel is to be established.

Each of base stations 11 to 13 and 61 to 63 includes a measurement instrument (not shown) for measuring a ratio of a desired signal power of an uplink channel to an interference signal power of the uplink channel (hereinafter referred to as a SIR: Signal Interference Ratio). The base station measures the SIR upon each receipt of a slot of communication channel of the uplink channel. For controlling transmission power from the mobile station of the uplink channel, the base station informs a control command to increase power when the SIR measured every slot is smaller than a target value, and a control command to decrease power, when the SIR is larger than the target value. The mobile station controls the transmission power based on the control command transmitted from the base station in which a line is established with the mobile station. Thus in each of the base stations, the SIR of the signal transmitted from the mobile station in which a channel is established with the base station will be close to the target value.

In this embodiment, carrier frequencies Fa1 to Fa3 of the uplink channel and carrier frequencies Ga1 to Ga3 of the downlink channel are set for each of base stations 11 to 13. Further, carrier frequencies Fb1 to Fb3 of the uplink channel and carrier frequencies Gb1 to Gb3 of the downlink channel are set for each of base stations 61 to 63.

Base stations 11 to 13 of cellular system A obtain information concerning central frequencies of carrier frequencies Fb1 to Fb3 of the uplink channel used by cellular system B, as well as information concerning codes used in perch channels through a communication network to which a control station in cellular system B is connected. The code refers to a spreading code used at the time of spreading modulation. The information is conveyed to mobile station 21 using the perch channels of carrier frequencies Ga1 to Ga3 of the downlink channel.

From the information that is being reported from base stations 11 to 13, mobile station 21 can get carrier frequencies Ga1 to Ga3 of the downlink channel used by base stations 61 to 63 of cellular system B and the spreading code used in the transmitted perch channel. Mobile station 21 can measure the received power of the perch channel transmitted from each of base stations 61 to 63 using the information of spreading code and the carrier frequencies.

As discussed above, from the information concerning the central frequency of the perch channel of another cellular system, it is possible to set the carrier frequency which can receive the perch channel. In addition, by informing the code of the informed perch channel of another cellular system, the mobile station can receive the perch channel if it searches only for the informed code. Therefore, the mobile station is able to easily receive the perch channel. In this manner, the mobile station measures also the received power of the perch channel transmitted by the base station of another cellular system.

It is assumed that in mobile station 21 of this embodiment, the received power of perch channel 31 among the perch channels transmitted by the base station of cellular system A is at a maximum. Mobile station 21 thus establishes a channel with base station 11. A transmission from base station 11 to mobile station 21 is performed on communication channel 41 of the downlink channel, while a transmission from mobile station 21 to base station 11 is performed on communication channel 51 of the uplink channel.

On the other hand, in mobile station 71, it is assumed that the received power of perch channel 81 among the perch channels transmitted by the base station of cellular system B is at a maximum. Mobile station 71 establishes communication channel 91 of the downlink channel and communication channel 101 of the uplink channel together with base station 61, and performs communication with base station 61. Further, mobile station 21 of cellular system A measures the perch channels of base stations 61 to 63 of cellular system B. The received power of the perch channel of base station 61 among these perch channels is assumed to maximum.

Next, operations of mobile station 21 and base station 11 of this embodiment will be described with reference to FIGS. 6, 7 and 8. In the following descriptions, the transmission power and the received power are treated having the same decibel (dB) value.

First, the operation of mobile station 21 will be described with reference to FIG. 6.

In step 701, when a request for communication with base station 11 is made, mobile station 21 measures received power Qp2 of the perch channel of base station 61 in cellular system B. Next, in step 702, mobile station 21 determines whether or not the measured received power Qp2 is larger than threshold Qth1. If the measured received power Qp2 is larger than threshold Qth1, in step 702 then mobile station 21 requests a carrier frequency which is not adjacent to carrier frequencies (hereinafter referred to as a non-adjacent carrier frequency) Fb1 to Fb3 in cellular system B from base station 11 in step 703. Then, in step 705, base station 11 decides to allocate either non-adjacent carrier frequency Fa1 or non-adjacent carrier frequency Fa2, which is not adjacent to carrier frequency Fb1 as a signal of the uplink channel and informs allocation of mobile station 21.

On the other hand, if received power Qp2 is equal to or less than threshold Qth1 (hereinafter referred to as an adjacent carrier frequency Fa3) in step 702, mobile station 21 requests a carrier frequency Fa3 adjacent to either the non-adjacent carrier frequency or carrier frequency Fb1 of cellular system B from base station 11 in step 704. The request for the allocation of either the non-adjacent carrier frequency or the adjacent carrier frequency means a request for a selection of voluntary frequency. Then, in step 705, base station 11 decides the allocation for a signal of the uplink channel from among carrier frequencies Fa1 to Fa3, and informs the allocation to mobile station 21.

In this manner, base station 11 decides the carrier frequency to be allocated based on the request from mobile station 21 to inform it to mobile station 21. Mobile station 21 receives the allocation report. Next, in step 706, mobile station 21 starts communication using the carrier frequency received from base station 11.

In step 707, even during the communication, mobile station 21 measures received power Qp2 of the perch channel of base station 61 to 63 in cellular system B. Next, in step 708, mobile station 21 determines whether or not the received power Qp2 of the perch channel of base station 61 closest to the mobile station 21 is larger than threshold Qth1, base station 61 exhibiting the largest received power. If it is determined that received power Qp2 is larger than threshold Qth1 in step 708, then mobile station 21 determines whether or not adjacent carrier frequency Fa3 is in use in step 709.

If adjacent carrier frequency Fa3 is in use in step 709, then mobile station 21 requests the allocation of non-adjacent carrier frequencies from base station 11 in step 710.

Upon receipt of the allocation request of the non-adjacent carrier frequency transmitted from mobile station 21, base station 11 decides the allocation of a signal of the uplink channel from carrier frequencies Fa1 and Fa2, and informs mobile station 21 of the allocation.

If received power Qp2 is equal to or less than threshold Qt1 in step 708, mobile station 21 determines whether or not the non-adjacent carrier frequency is in use in step 711. If the non-adjacent carrier frequency is in use in step 711, mobile station 21 informs base station 11 that the adjacent carrier frequency is available, in step 712. Upon receipt of the information, base station 11 compares the load of the carrier frequency now in use with the load of the adjacent carrier frequency. If the load of the carrier frequency now in use is larger than the load of the adjacent carrier frequency, base station 11 changes the carrier frequency to adjacent carrier frequency Fa3.

A case where the load of the carrier frequency now in use is larger than the load of the adjacent carrier frequency refers to, for example, a case where the number of the mobile stations using the carrier frequency now in use is close to line capacitance limitation and the number of the mobile stations using adjacent carrier frequency Fa3 is small. When performing the change of the carrier frequency, base station 11 informs mobile station 21 of the result of the carrier frequency change.

In step 713, mobile station 21 determines whether or not mobile station 21 has received the notice of the carrier frequency change from base station 11. If mobile station 21 has received the notice of the carrier frequency change, then mobile station 21 changes the carrier frequency now in use to the carrier frequency reported in step 714. Then, mobile station 21 determines whether or not the communication has been terminated in step 715. If the communication has been terminated, mobile station 21 finishes the procedure, and if not, mobile station 21 continues the communication and repeats the foregoing procedures from step 707.

Next, an operation of base station 11 will be described with reference to FIGS. 7 and 8.

Figure 6:
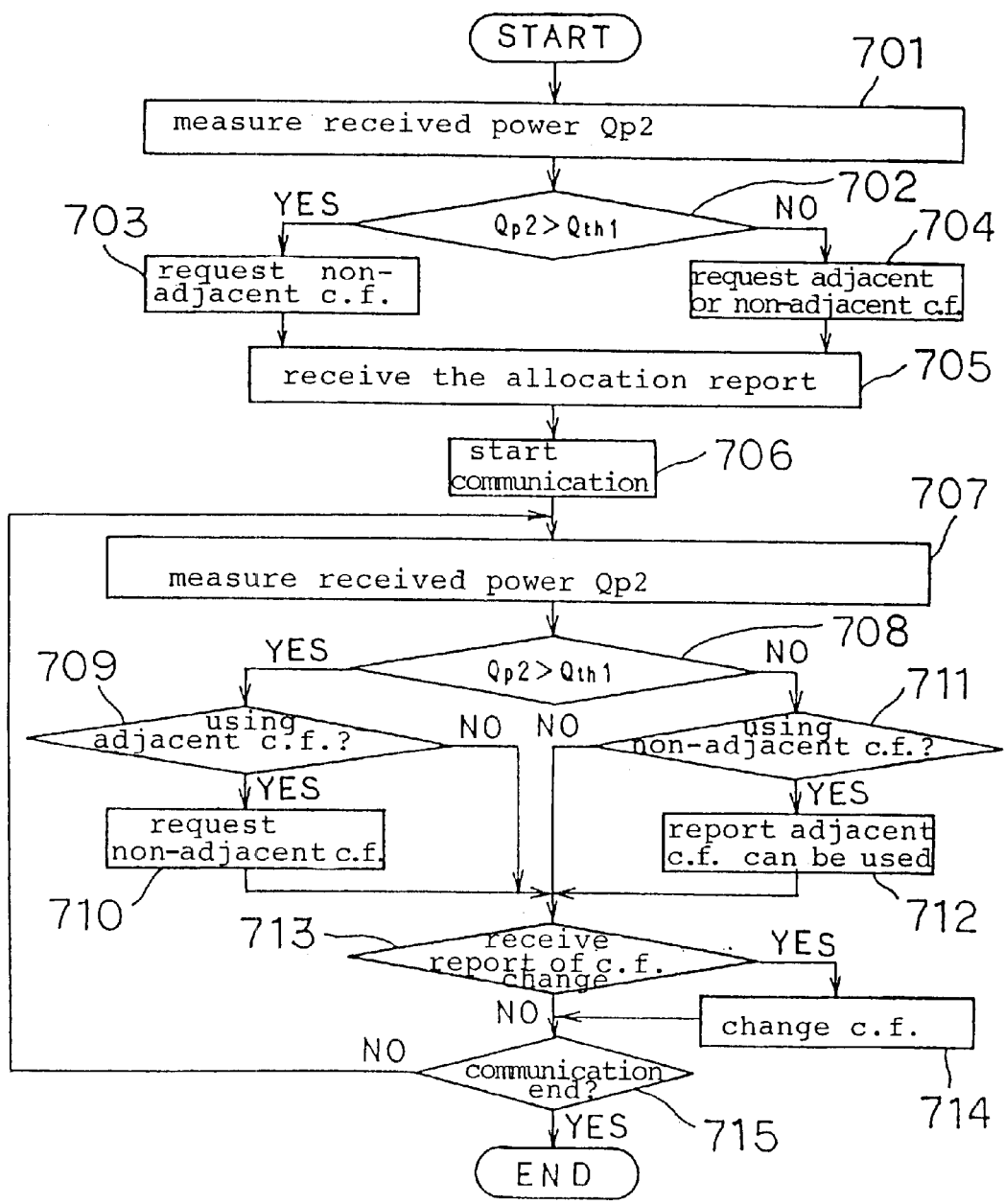
FIG. 6 is a flowchart showing an operation of a mobile station in the cellular system of FIG. 2.

In step 601, upon receipt of the request for the allocation of the carrier frequency from mobile station 21 shown in step 703 or step 704 of the flow chart in FIG. 6, base station 11 determines whether or not the request for the allocation of the carrier frequency is a request for an allocation of the non-adjacent carrier frequency or a request for an allocation of either the non-adjacent carrier frequency or the adjacent carrier frequency, in step 602. Then, in step 602, if the request for the allocation of the carrier frequency received from mobile station 21 is a request for the allocation of the non-adjacent carrier frequency, base station 11 decides the allocation of the non-adjacent carrier frequency in step 603. In step 602, if the request for the allocation of the carrier frequency received from mobile station 21 is a request for the allocation of either the non-adjacent carrier frequency or the adjacent carrier frequency, base station 11 decides the allocation of any of the non-adjacent and adjacent carrier frequencies in step 604.

Finally, in step 605, base station 11 transmits the decided allocation of the carrier frequency to mobile station 21, which corresponds to step 705 in the flowchart of FIG. 6.

Figure 8:
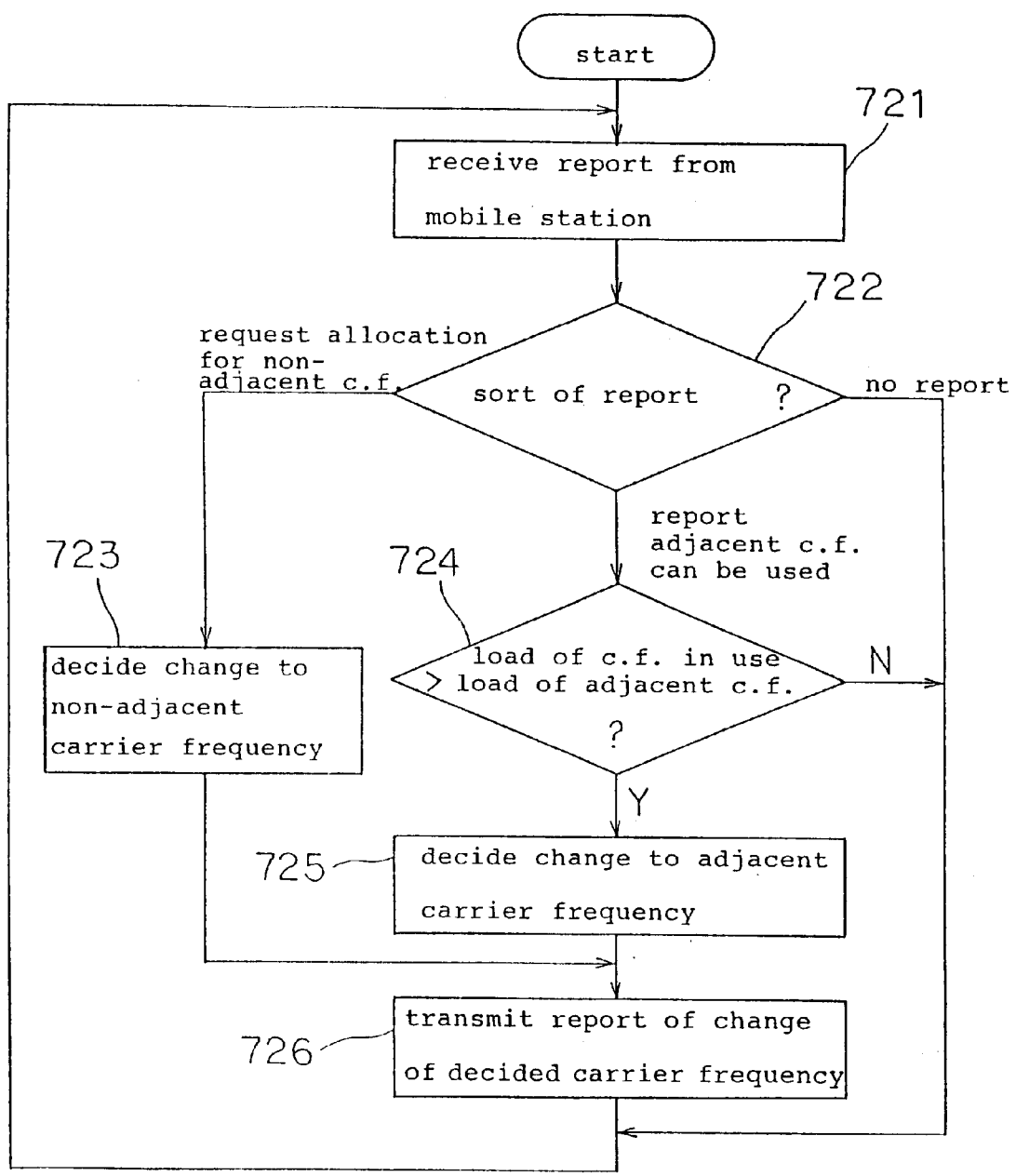
FIG. 8 is a flowchart showing a frequency change operation of the mobile station in the cellular system of FIG. 2.

As shown in FIG. 8, after base station 11 starts the communication with mobile station 21, upon receipt of the report from mobile station 21, in step 721 base station 11 determines the sort of the notice in step 722. The notice from mobile station 21 involves request for allocation of the non-adjacent carrier frequency in step 710 of the flowchart of FIG. 6 and request for allocation of the adjacent carrier frequency in step 712. Further, nothing may be included in the notice.

If the notice received from mobile station 21 is to inform the allocation of the non-adjacent carrier frequency in step 722, base station 11 decides the change of the carrier frequency to the non-carrier frequency in step 723.

If the report received from mobile station 21 is to inform that the adjacent carrier frequency can be allocated in step 722, base station 11 compares the load of the carrier frequency now in use with the load of the adjacent carrier frequency in step 724.

If the load of the carrier frequency now in use is greater than the load of the adjacent carrier frequency in step 724, base station 11 decides the change of the carrier frequency to the adjacent carrier frequency in step 725. If the load of the carrier frequency now in use is equal or smaller than the load of the adjacent carrier frequency in step 724, base station 11 does not change the carrier frequency now in use.

If the base station 11 does not receive a notice from mobile station 21 in step 722, base station 11 does not change the carrier frequency now in use.

Finally, in step 726, base station 11 transmits a notice of the change of the decided carrier frequency to mobile station 21, which corresponds to step 713 in the flowchart of FIG. 6.

When mobile station 21 uses the non-adjacent carrier frequency for a signal of the uplink channel, mobile station 21 uses either carrier frequency Ga1 or carrier frequency Ga2 in which a signal of the uplink channel is also not adjacent to a signal of cellular system B. When mobile station 21 uses the adjacent carrier frequency as a signal of the uplink channel, it selects and uses any signal of the downlink channel among carrier frequencies Ga1 to Ga3.

Next, a method of setting threshold Qth1 used in the above descriptions will be described with reference to FIG. 9.

Figure 9:
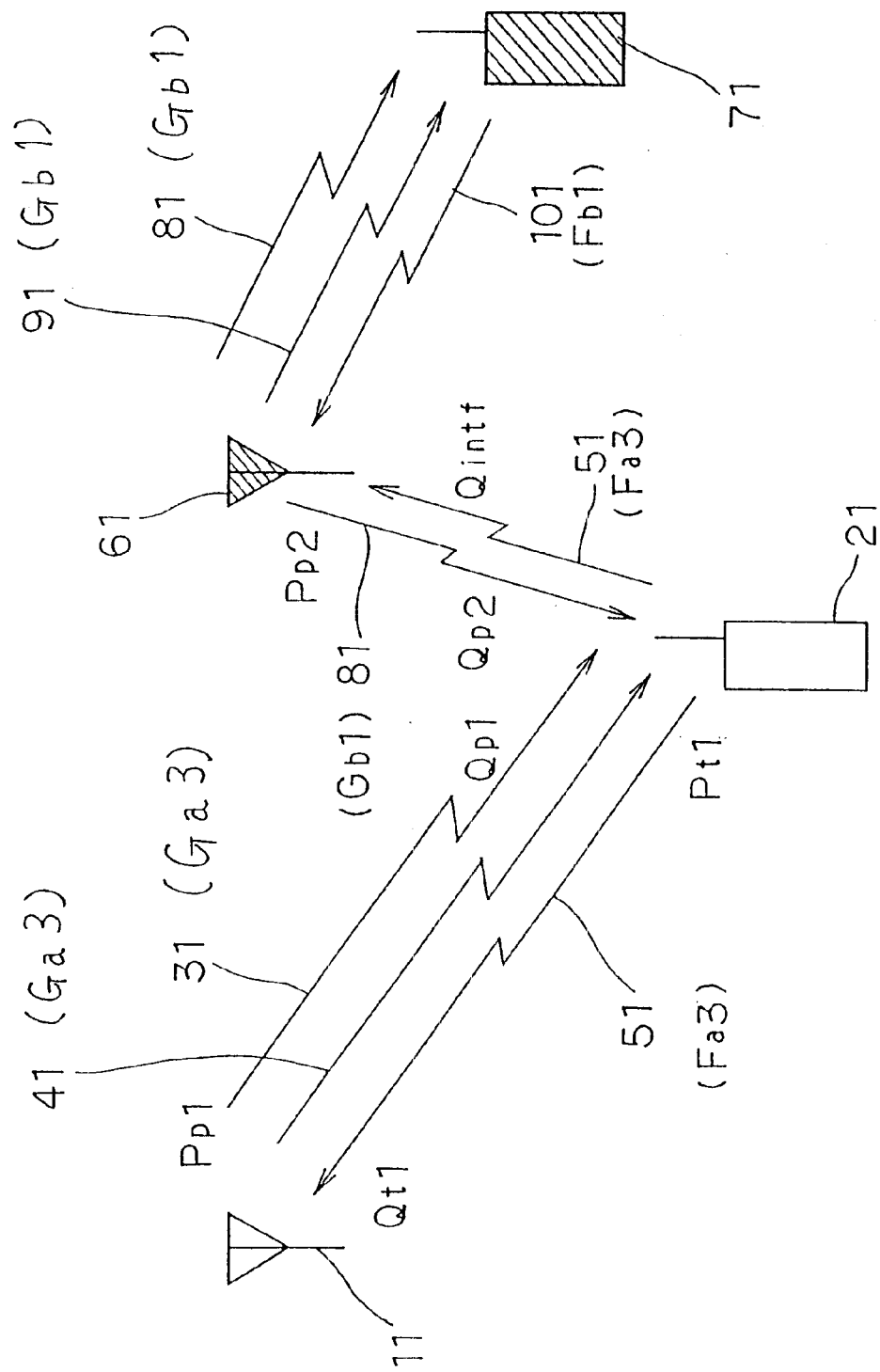
FIG. 9 is an explanatory view of relationship of transmitting/receiving signals between a base station and a mobile station with interference of adjacent frequencies.

FIG. 9 shows a case when in the cellular system shown FIG. 2, base station 11 transmits a perch channel and communication channel of a downlink channel using carrier frequency Ga3, base station 61 transmits a perch channel and a communication channel of the downlink channel using carrier frequency Gb1, mobile station 21 transmits a communication channel of an uplink channel using carrier frequency Fa3, and mobile station 71 transmits a communication channel of the uplink channel using carrier frequency Fb1. For this reason, in FIG. 9, the communication channel of the uplink channel of mobile station 21 using carrier frequency Fa3 causes interference of adjacent frequencies to the communication channel of the uplink channel of mobile station 71.

The transmission power of the perch channel of base station 61 is denoted by Pp2, and the received power Qp2 in the mobile station is denoted by Qp2. Furthermore, the transmission power of mobile station 21 is denoted by Pt1; the received power in base station 11 of the signal from mobile station 21, Qt1; and the adjacent frequency from mobile station 21 in base station 61, Qintf.

Further, the propagation loss between base station 61 and mobile station 21 is denoted by L2, and the suppression amount of the leakage power to the adjacent frequency is denoted by Aadj. Qp2, Qt1, Qintf and L2 denote a short interval median excluding a variation in phasing, and it is assumed that the propagation loss of the uplink channel and the propagation loss in the downlink channel are equal to each other. A relationship between propagation loss L2, transmission power Pp2 of the perch channel and received power Qp2 is expressed by the following equation:.

$$L2=Pp2-Qp2 \quad (1)$$

Further, when the transmitter of mobile station 21 is configured such that the power of the interference of adjacent frequencies from carrier frequency Fa3 to Fb1 in base station 61 is smaller than the received power of carrier frequency Fa3 by suppression amount Aadj, interference of adjacent frequencies signal power Qintf is computed by the following equation:.

$$Qintf=Pt1-L2-Aadj=Pt1-Pp2+Qp2-Aadj \quad (2)$$

When the permissible value of the adjacent frequency power of base station 61 is denoted by Qintfmax, the condition in which the interference of adjacent frequencies signal power is made to be equal to or less than the permissible value is expressed by the following equation:.

$$Qintfmax>Qintf>Pt1-Pp2+Qp2-Aadj \quad (3)$$

When the equation (3) is modified, the following equation (4) can be obtained.

$$Qp2<Qintfmax+Aadj+Pp2-Pt1 \quad (4)$$

Accordingly, even when the transmission power of a mobile station takes maximum value Pmax (maximum transmission power value which is the upper limit that the mobile station can transmit), the condition in which the power of the interference of adjacent frequencies is made to be equal or equal to or less than the allowable value is expressed by the following equation (5) and (6):

$$Qp2<Qintfmax+Aadj+Pp2-Pmax \quad (5)$$

$$Qth1=Qintfmax+Aadj+Pp2-Pmax \quad (6)$$

In the base station of cellular system A, assuming that the set range of the transmission power of the perch channel of the base station in cellular system B is known at the time of obtaining threshold Qth1, the minimum value of the transmission power is used as Pp2. As shown in the equation (6), threshold Qth1 is set also depending on suppression amount Aadj of the leakage power to the adjacent frequency.

In this method, when the interference of adjacent frequencies caused the base station of cellular system B, where is around the mobile station satisfies the equation (5), that is a condition for making it to be equal to or less than the permissible value, the adjacent carrier frequency may be used. At this time, though the mobile station performs transmission with the maximum transmission power, the adjacent frequency interference signal power will be equal to or less than the allowable value.

If the equation (5) is not satisfied, no interference of adjacent frequencies occurs, because the non-adjacent carrier frequency is used. The transmitter of the base station in cellular system B, which is around the mobile station, is such that it is capable of suppressing adjacent frequency interference similarly to mobile station 21. For this reason, when the adjacent carrier frequency is not used in the uplink channel, the interference of adjacent carrier frequencies to the mobile station from the base station in cellular system B can be prevented by constituting the mobile station such that it does not use the adjacent carrier frequency in the downlink channel, Therefore, adjacent interference can be prevented.

Second Embodiment

A method of preventing interference of adjacent frequencies in a cellular system according to a second embodiment of the present invention is equivalent to the foregoing first embodiment except that a mobile station acquires information concerning a perch channel of another cellular system.

In this embodiment, base stations 11 to 13 do not inform mobile station 21 of information concerning the perch channel of cellular system B. Instead of this, mobile station 21 of cellular system A previously possesses information concerning the central frequency of carrier frequencies Fb1 to Fb3 of the downlink channel which are set in cellular system B and information concerning plural codes which have a possibility to be used in the perch channels.

Accordingly, mobile station 21 can immediately set the carrier frequency for receiving the perch channel. Furthermore, if mobile station 21 retrieves which code the base station is using among the plural codes, the mobile station 21 is able to receive the perch channel, so that a time necessary for receiving the perch channel can be shortened.

Third Embodiment

A method of preventing interference of adjacent frequencies in a cellular system according to a third embodiment of the present invention is equivalent to the first embodiment except for setting threshold Qth1.

In this embodiment, instead of threshold Qth1 in the first embodiment, a value is used, which is obtained by adding threshold Qth2 that is a certain value to received power Qp1 of the perch channel of cellular system A measured by the mobile station.

Furthermore, in this embodiment, base stations 11 to 13 and base stations 61 to 63 notify the mobile station about information of the transmission power of the perch channel itself in the perch channel. When the mobile station measures the received power of the perch channel, the mobile station can acquire the information concerning the transmission power.

Figure 10:
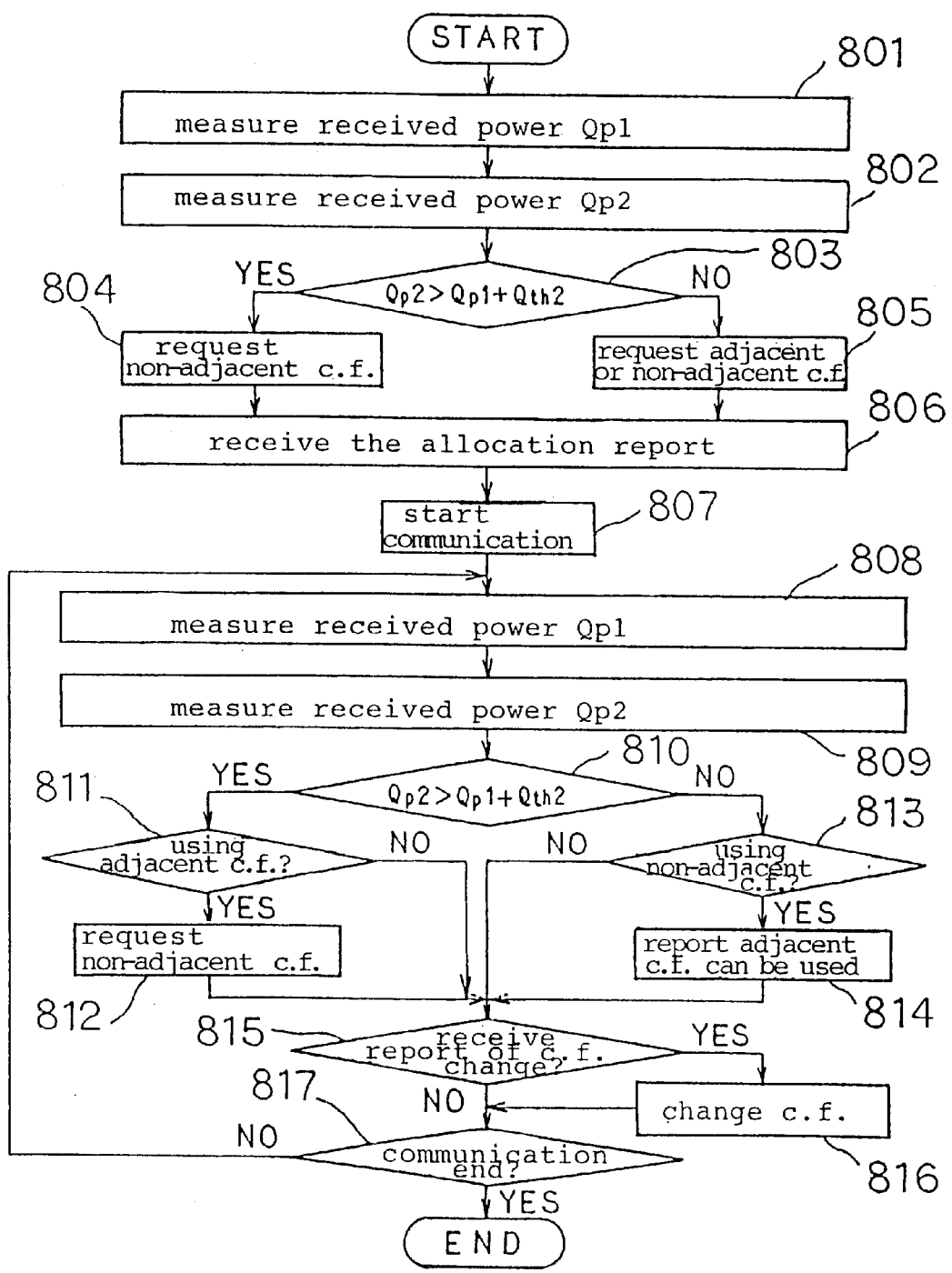
FIG. 10 is a flowchart showing an operation of a mobile station in a cellular system according to a third embodiment according to the present invention.

FIG. 10 is a flowchart showing an operation when mobile station 21 sets a signal of the uplink channel and performs communication.

Figure 7:
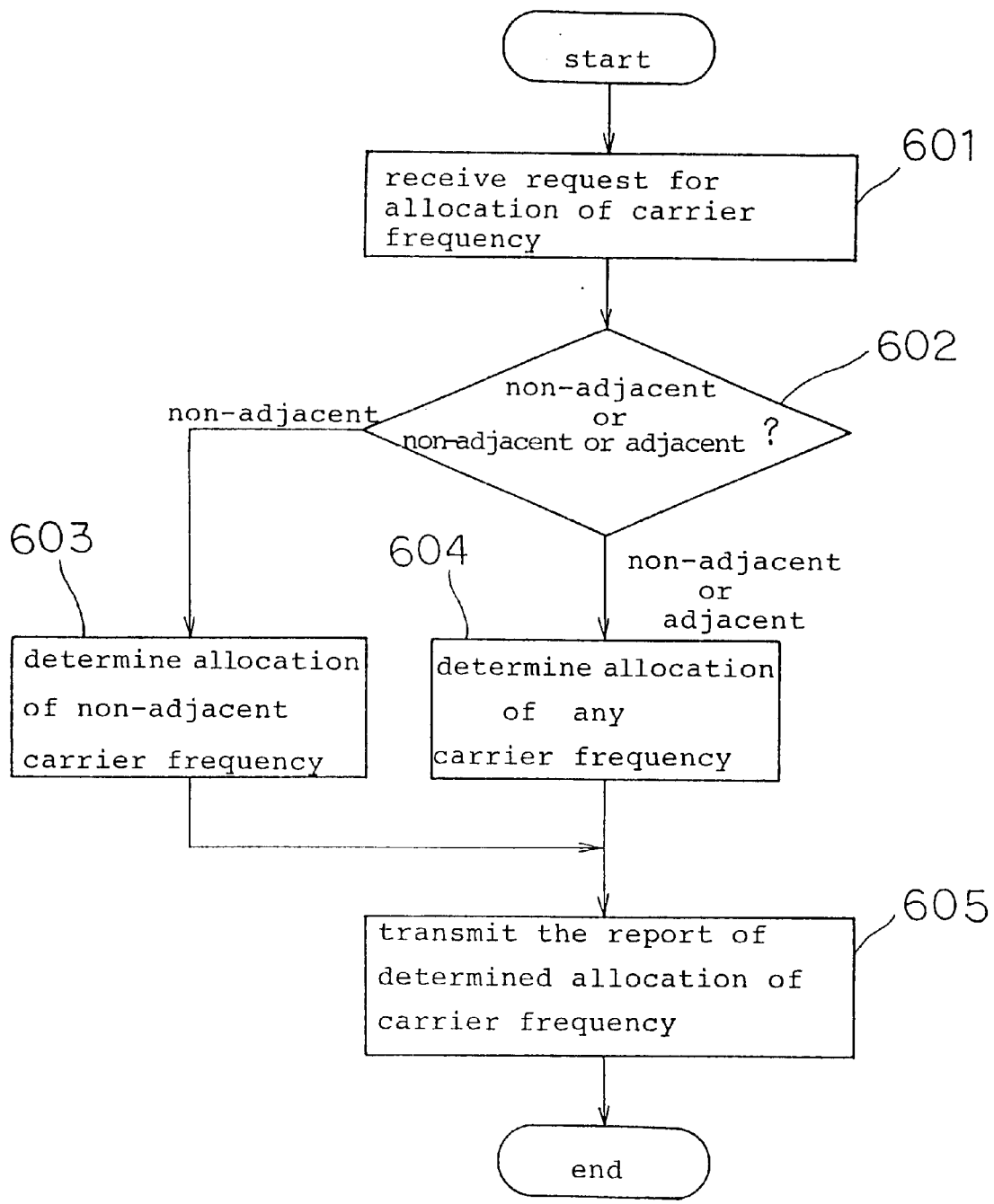
FIG. 7 is a flowchart showing a frequency allocation operation of a base station in the cellular system of FIG. 2.

Descriptions for an operation of base station 11 in this embodiment are omitted because it is equivalent to that of base station 11 in the first embodiment described by the flowchart of FIGS. 7 and 8.

When a request for a communication with base station 11 occurs, mobile station 21 measures received power Qp1 of the perch channel of base station 11 in cellular system A in step 801. Further, in step 802, mobile station 21 measures received power Qp2 of the perch channel of base station 61 in cellular system B in step 802. In step 803, mobile station 21 decides whether or not received power Qp2 is larger than the sum of received power Qp1 and threshold Qth2. In step 803, when received power Qp2 is larger than the sum of received power Qp1 and threshold Qth2, mobile station 21 requests from base station 11 the non-adjacent carrier frequency which is not adjacent to carrier frequencies Fb1 to Fb3 of cellular system B in step 804. At this time, base station 11 determines the allocation of either carrier frequency Fa1 or carrier frequency Fa2 which is not adjacent to carrier frequency Fb3 as a signal of the uplink channel, and reports information concerning the allocation to mobile station 21.

On the other hand, in step 803, when received power Qp2 is equal to or less than the sum of received power Qp1 and threshold Qth2, mobile station 21 requests either the non-adjacent carrier frequency or the adjacent carrier frequency from base station 11 in step 805. At this time, base station 11 determines the allocation of a signal of the uplink channel among carrier frequencies Fa1 to Fa3, and reports information concerning the allocation to mobile station 21. Thus, in step 806, base station 11 determines the carrier frequency allocated according to the request from mobile station 21 and reports to mobile station 21 this determination, and then mobile station 21 receives the allocation report.

Then, in step 807, mobile station 21 starts the communication using the carrier frequency reported from base station 11. In step 808, even during the communication with base station 11, mobile station 21 measures received power Qp1 of the perch channel of base station 11 with which a channel is established. Then, in step 809, mobile station 21 measures also the received powers of the perch channels of base stations 61 to 63 in cellular system B, and the received power of the perch channel of the base station closest to mobile station 21 is assumed to be received power Qp2, which exhibits the maximum received power among them.

Then, in step 810, mobile station 21 decides whether or not received power Qp2 is larger than the sum of received power Qp1 and threshold Qth2. In step 810, when received power Qp2 is larger than the sum of received power Qp1 and threshold Qth2, mobile station 21 decides whether or not the adjacent carrier frequency is being used in step 811. In step 811, when the adjacent carrier frequency is being used in step 811, mobile station 21 requests the allocation of the non-adjacent carrier frequency from base station 11 in step 812. Upon receipt of this request, base station 11 determines the allocation of a signal of the uplink channel from carrier frequencies Fa1 and Fa2, and reports information concerning the allocation to mobile station 21. In step 810, when received power Qp2 is equal to or less than the sum of received power Qp1 and threshold Qth2, in step 813 mobile station 21 decides whether or not the non-adjacent carrier frequency is being used. In step 813, when the non-adjacent carrier frequency is being used, mobile station 21 reports that it is possible to use the adjacent carrier frequency to base station 11, in step 814. Base station 11 receives this report. At this time, when the number of the base stations using the carrier frequency now in use is close to a channel capacitance limit and the number of mobile stations using the carrier frequency Fa3 is small, base station 11 performs the change of the carrier frequency to carrier frequency Fa3. When the change of the carrier frequency is performed, base station 11 reports to mobile station 21 the determination of the carrier frequency change.

Next, in step 815, mobile station 21 decides whether or not mobile station 21 has received the report of the carrier frequency change. In step 815, when mobile station 21 has received the report, mobile station 21 changes the carrier frequency according to the report in step 816. Furthermore, in step 817, mobile station 21 decides whether or not the communication has been terminated, if the communication has not been terminated, mobile station 21 continues the communication, and iterates the procedures from step 808.

When the non-adjacent carrier frequency is used for a signal of the uplink channel, carrier frequency Ga1 or Ga2 which is not adjacent to the carrier frequency of cellular system B is used also as a signal of the downlink channel. Moreover, when the adjacent carrier frequency is used as a signal of the uplink channel, a signal of the downlink channel is selected among carrier frequencies Ga1 to Ga3, and used.

Next, a method for setting threshold Qth2 in this embodiment will be described with reference to FIG. 9.

Similarly to the first embodiment, the condition in which the interference of adjacent frequencies signal power is equal to or less than the allowable value is given by equation (4).

The transmission power of the perch channel of base station 11 is denoted as Pp1, the transmission power in its mobile station 21 is denoted as Qp1, and the propagation loss between base station 11 and mobile station 21 is denoted as L1. Hereupon, Pp1, Qp1 and L1 denote a short interval median. There is a relationship among propagation loss L1, transmission power Pp1 of the perch channel and received power Qp1, which is expressed by the following equation (7).

$$L1 = Pp1 - Qp1 \qquad (7)$$

Furthermore, received power Qt1 of a signal from mobile station 21 in base station 11 is given by the following equation (8).

$$Qt1 = Pt1 - L1 \qquad (8)$$

Received power Qt1 controls transmission power Pt1 of the mobile station so that SIR is close to the target value. Assuming that the received power is Qtgt at the time when SIR comes to be equal to the target value, when transmission power Pt1 is controlled, received power Qtgt is expressed by the following equation (9).

$$Qtgt = Qt1 \qquad (9)$$
$$= Pt1 - L1$$
$$= Pt1 - Pp1 + Qp1$$

By rearranging the equation (9), the following equation (10) can be obtained.

$$Pt1 = Qtgt + Pp1 - Qp1 \qquad (10)$$

Substituting the equation (10) into the equation (4), the following equation (11) can be obtained.

$$Qp2 < Qp1 + Qintfmax - Qtgt + Aadj + Pp2 - Pp1 \qquad (11)$$

Subsequently, threshold Qth2 is set to the value shown in the following equation (12) from the equation (11).

$$Qth2=Qintfmax-Qtgt+Aadj+Pp2-Pp1 \quad (12)$$

In this embodiment, since mobile station 21 receives perch channel 31 and perch channel 81 that are being transmitted from base stations 11 and 61, respectively, mobile station 21 uses these values for transmission powers Pp1 and Pp2. Thus, threshold Qth2 will be set in association with a difference between transmission powers Pp1 and Pp2 of perch channels 31 and 81 that are being transmitted from base stations 11 and 61, respectively.

According to this method, when the interference of adjacent frequencies satisfies the equation (11) that is a condition for allowing it to be equal to or less than the allowable value, the adjacent carrier frequency is sometimes used. At this time, the mobile station controls the transmission power, so that the interference of adjacent frequencies signal power will be equal to or less than the allowable value. When the interference of adjacent frequencies does not satisfy the condition of the equation (11), the non-adjacent carrier frequency is used, so that no interference of adjacent frequencies occurs. Therefore, it is possible to prevent the interference of adjacent frequencies.

In this embodiment, the mobile station can prevent the interference of adjacent frequencies similarly to the first embodiment, and the range where the adjacent carrier frequency can not be used is narrowed, so that the range where the adjacent carrier frequency can be used is widened, resulting in an increase in a frequency efficiency.

Fourth Embodiment

Next, a method of preventing interference of adjacent frequencies in a cellular system according to a fourth embodiment of the present invention will be described.

This embodiment is applied to the cellular system shown in FIG. 2 similarly to the first embodiment.

Mobile station 21 measures the received powers of the perch channels of base stations 61 to 63 in cellular system B by utilizing an idle-time of downlink channel 41. However, where no idle-time is available, it is impossible to measure the received powers of the perch channels of base stations 61 to 63 in cellular system B.

When the communication request for intermittently receiving communication channel 41 of the downlink channel occurs in mobile station 21, base station 11 selects and allocates Fa3 that is the carrier frequency which is adjacent to carrier frequencies Fb1 to Fb3 of the uplink channel in cellular system B.

When the communication request for continuously receiving communication channel 41 of the downlink channel occurs in mobile station 21, base station 11 selects and allocates either Fa1 or Fa2 that is carrier frequency which is not adjacent to carrier frequencies Fb1 to Fb3 of the uplink channel in cellular system B.

Specifically, the base station preferentially allocates the adjacent carrier frequencies to the mobile station which is capable of measuring the received power of the perch channel of the signal in cellular system B, and allocates the non-adjacent carrier frequency to the mobile station which is incapable of measuring the received power of the perch channel of the signal in cellular system B.

In this embodiment, the mobile station can prevent the interference of adjacent frequencies similarly to the first embodiment, and the base station never allocates the adjacent carrier frequency to the mobile station which has no so-called idle downlink channel because of continuous receipt of the communication channel of the downlink channel.

Fifth Embodiment

Next, a method of preventing interference of adjacent frequencies in a cellular system according to a fifth embodiment of the present invention will be described.

This embodiment is applied to the cellular system shown in FIG. 2 similarly to the first embodiment.

Base stations 11 to 13 and base stations 61 to 63 notify information concerning the transmission power of the perch channel itself in the perch channel, and the mobile station receives the information concerning the transmission power when the mobile station measures the received power of the perch channel.

The mobile station in this embodiment computes the upper limit Pmaxtmp of the transmission power which allows the interference of adjacent frequencies to be equal to or less than the allowable value, when the adjacent carrier frequency is used. Moreover, the mobile station obtains received power Qmax of the base station at that time from upper limit Pmaxtmp. When upper limit Pmaxtmp is smaller than received power Qtgt, the mobile station request the allocation of the adjacent carrier frequency from the base station.

Figure 11:
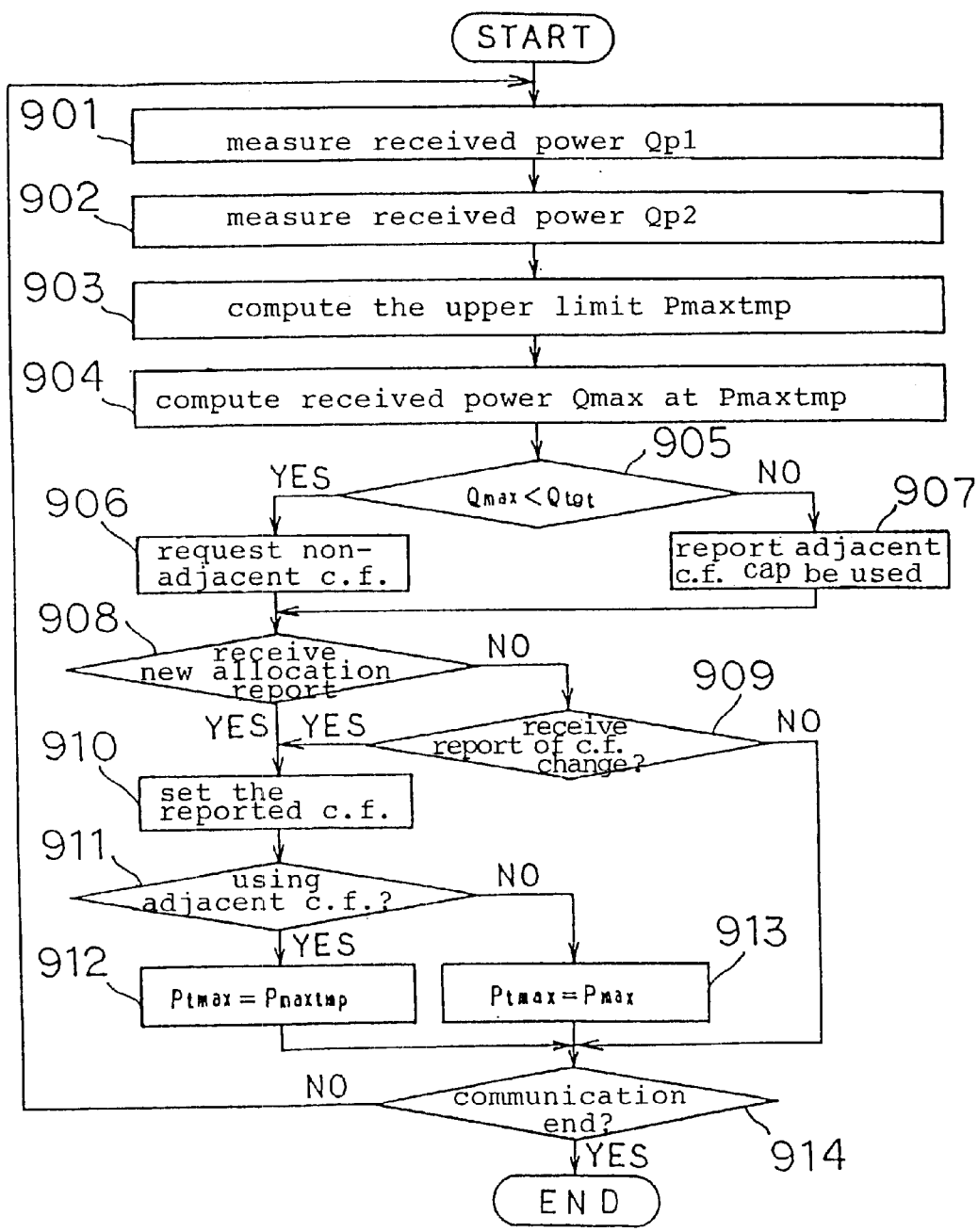
FIG. 11 is a flowchart showing an operation of a mobile station in a cellular system according to a fifth embodiment according to the present invention.

FIG. 11 is a flowchart showing an operation when mobile station 21 sets a signal of the channel to perform the communication.

An operation of base station 11 in this embodiment is the same as that of base station 11 in the first embodiment described by the flowchart of FIGS. 7 and 8, and descriptions for it are omitted.

When the request for the communication with base station 11 occurs, mobile station 21 measures received power Qp1 of the perch channel of base station 11 in cellular system A in step 901. Furthermore, mobile station 21 measures received power Qp2 of the perch channel of base station 61 in cellular system B in step 902. Then, in step 903, when the adjacent carrier frequency is used, mobile station 21 computes the upper limit Pmaxtmp of the transmission power which allows the interference of adjacent frequencies to be equal to or less than the allowable value, and computes received power Qmax in base station 11 at the time of that transmission power in step 904.

Next, in step 905, mobile station 21 decides whether or not received power Qtgt at the time when SIR of the signal of the uplink channel in the base station comes to be the target value is larger than received power Qmax. In step 905, if received power Qtgt is larger than received power Qmax, since with the usage of the adjacent carrier frequency it is impossible to make SIR larger than the target value in spite of the fact that the transmission power is made to be larger than upper limit Pmaxtmp, mobile station 21 requests from base station 11 the adjacent carrier frequency which is not adjacent to carrier frequencies Fb1 to Fb3 of cellular system B. At this time, base station 11 determines the allocation of either carrier frequency Fa1 or Fa2 which is not adjacent to carrier frequency Fb1, as a signal of the uplink channel, and reports information concerning the allocation to mobile station 21. In step 905, when received power Qmax is equal to or less than received power Qtgt, since in spite of the use of the adjacent carrier frequency, SIR of the signal of the uplink channel can be made to be more than the target value while keeping the transmission power equal to or less than the upper limit Pmaxtmp, mobile station 21 reports that the it is possible to use adjacent carrier frequency to base station 11 in step 907.

At this time, base station 11 determines the signal of the uplink channel to be allocated among carrier frequencies Fa1 to Fa3, and reports information of the allocation to mobile station 21. As described above, base station 11 determines the carrier frequency to be allocated in response to the request from mobile station 21, and reports it to mobile station 21. Upon receipt of the new allocation report of the carrier frequency, mobile station 21 set the reported carrier frequency in step 910. When the adjacent carrier frequency is set, upper limit Ptmax of the transmission power is made to be equal to upper limit Pmaxtmp in step 912. When the carrier frequency other than the adjacent carrier frequency is set, maximum transmission power Pmax of the transmitter of mobile station 21 is made to be equal to upper limit Ptmax of the transmission power.

Then, mobile station 21 set the upper limit of the transmission power to Ptmax and starts the communication. During the communication, mobile station 21 repeats the procedure from step 901, and when mobile station 21 receives the report of the frequency change in step 909, mobile station 21 sets the carrier frequency, and updates also upper limit Ptmax of the transmission power.

When the non-adjacent carrier frequency is used for the signal of the uplink channel, Ga1 or Ga2, that is the carrier frequency which is not adjacent to the carrier frequency of cellular system B, is used also as the signal of the downlink channel. Moreover, when the adjacent carrier frequency is used as a signal of the uplink channel, the signal of the downlink channel is selected from among Ga1 to Ga3 and used.

Next, a method for setting Pmaxtmp and Qmax in this embodiment will be described with reference to FIG. 9.

In this embodiment, since the relationship of the transmission power and received power between the base station and the mobile station is perfectly equivalent to that of the first embodiment, when the adjacent carrier frequency is used, the condition in which the interference of adjacent frequencies power is equal to or less than the allowable value is expressed by the equation (3). By rearranging the equation (3), the following equation (13) is obtained.

$$Pt1 < Qintfmax + Pp2 - Qp2 + Aadj \qquad (13)$$

Accordingly, Pmaxtmp is set by the following equation.

$$Pmaxtmp = Qintfmax + Pp2 + Aadj - Qp2 \qquad (14)$$

The mobile station receives a value of the transmission power of perch channel 81 which is reported from base station 61 and uses it as Pp2. In order to perform the communication using the adjacent carrier frequency, the received power in the base station at the time when the transmission power is equal to Pmaxtmp must be equal to or more than target value Qtgt. Transmission power Qmax in base station 11 at the time when the transmission power of mobile station 21 is equal to Pmaxtmp is given by the following equation (15).

$$Qmax = Pmaxtmp - L1 \qquad (15)$$
$$= Qintfmax + Pp2 + Aadj - Qp2 - Pp1 + Qp1$$

The mobile station receives a value of the transmission power of perch channel 31 which is reported from base station 11 and uses it as Pp1.

According to this method, when the adjacent carrier frequency is used, the equation (13) is satisfied without making the transmission power larger than Pmaxtmp, so that the interference of adjacent frequencies will be equal to or less than the allowable value. When the transmission power, in which a received quality is a target, is larger than Pmaxtmp in the base station, the non-adjacent carrier frequency is used. Accordingly, the interference of adjacent frequencies can be prevented.

In the first embodiment, the adjacent carrier frequency is used only when no interference of adjacent frequencies occurs in spite of the transmission with Pmax. In this embodiment, a range where the adjacent carrier frequency can not be used is narrowed by using Pmaxtmp smaller than Pmax.

In this embodiment, the mobile station can prevent the interference of adjacent frequencies similarly to the first embodiment, and the range where the adjacent carrier frequency can not be used is narrowed, so that the range where the adjacent carrier frequency can be used is widened, resulting in an increase in a frequency efficiency.

Sixth Embodiment

Next, a method of preventing interference of adjacent frequencies in a cellular system according to a sixth embodiment of the present invention will be described.

The sixth embodiment is applied to the cellular system shown in FIG. 2, and the sixth embodiment differs from the first embodiment in the following points.

In FIG. 9, when mobile station 21 uses the adjacent carrier frequency, if transmission power Qp2 is fairly smaller than threshold Qth1, the movement of mobile station 21 during communication makes received power Qp2 larger than threshold Qth1. Hence, a necessity to change the carrier frequency would be less, compared to the case where received power Qp2 is close to threshold Qth1.

For this reason, in the case where received power Qp2 does not exceed threshold Qth1 and a difference between received power Qp2 and threshold Qth1 is small, if the adjacent carrier frequency is allocated, the necessity to change the carrier frequency can occur.

In this embodiment, in order to solve such problem, the carrier frequency requested is selected using threshold Qth3 smaller than threshold Qth1 in addition to threshold Qth1 in the first embodiment.

When received power Qp2 is larger than threshold Qth1, the mobile station in this embodiment uses the non-adjacent carrier frequency. When received power Qp2 is smaller than threshold Qth3, the mobile station preferentially uses the adjacent carrier frequency. When received power Qp2 is between thresholds Qth1 and Qth3, the mobile station uses any carrier frequency selected from all carrier frequencies.

Specifically, when received power Qp2 is fairly small and equal to or less than threshold Qth3, the mobile station in this embodiment decides that a possibility that received power Qp2 will exceed threshold Qth1 from a movement by the mobile station is low, and preferentially uses the adjacent carrier frequency. When a possibility that received power Qp2 will exceed threshold Qth1 from the movement by the mobile station is high because received power Qp2 is equal to threshold Qth1 and larger than threshold Qth3, the mobile station does not use the adjacent carrier frequency as possible.

Figure 12:
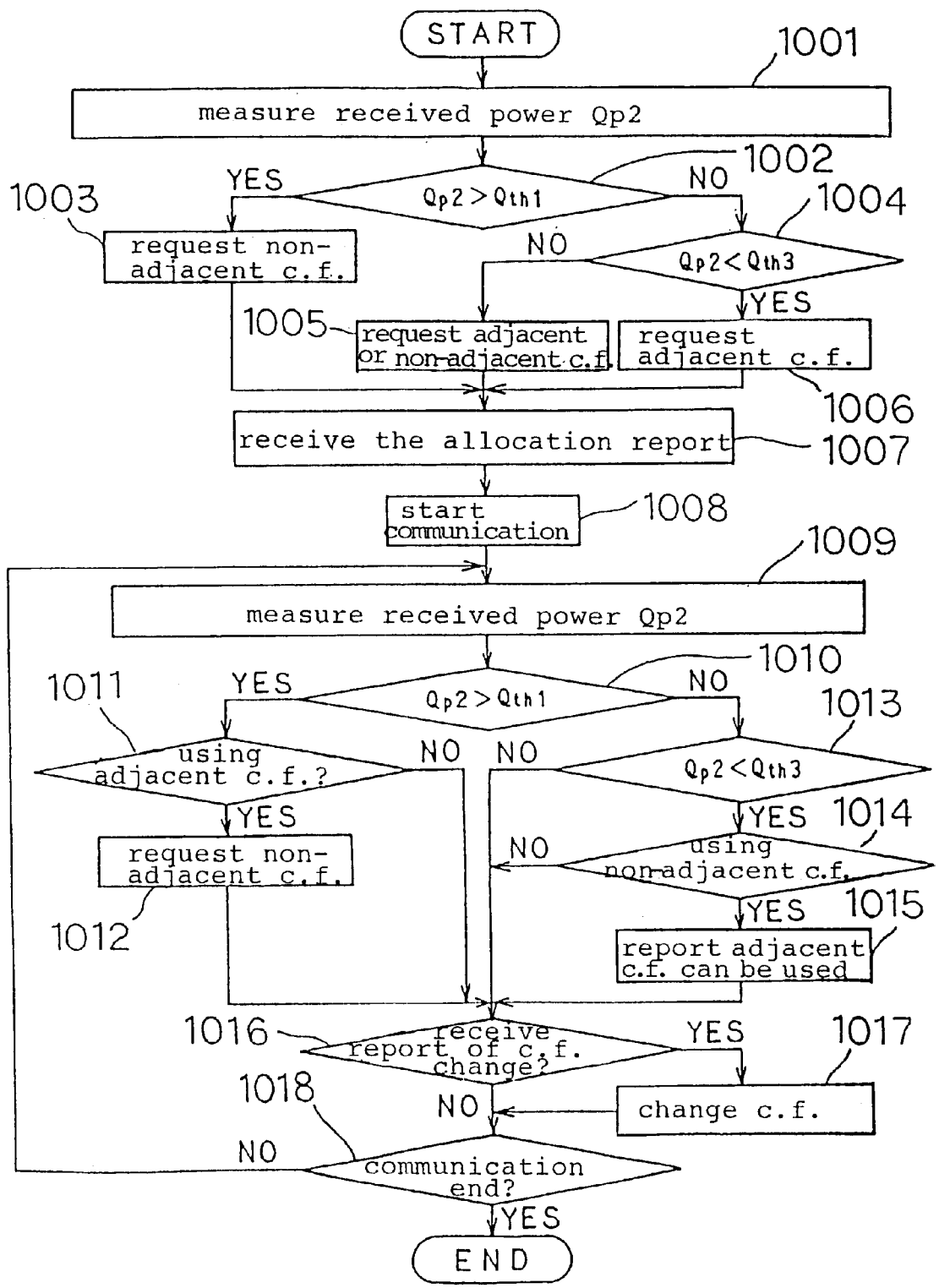
FIG. 12 is a flowchart showing an operation of a mobile station in a cellular system according to a sixth embodiment according to the present invention.

FIG. 12 is a flowchart in which mobile station 21 sets a signal of the uplink channel and performs communication.

Next, when a request for communication with base station 11 occurs, mobile station 21 measures received power Qp2 of a perch channel of base station 61 in cellular system B in step 1001. In step 1002, it is decided whether or not received power Qp2 is larger than threshold Qth1. When Qp2 is larger than threshold Qth1 in step 1002, mobile station 21 requests a non-adjacent carrier frequency which is not adjacent to carrier frequencies Fb1 to Fb3 of cellular system B in step 1003. In step 1002, when Qp2 is equal to or less than threshold Qth1, mobile station 21 decides whether or not third threshold Qth3 is larger than Qp2 in step 1004. In step 1004, when Qp2 is equal to or less than third threshold Qth3, mobile station 21 requests either a non-adjust carrier frequency or an adjacent carrier frequency from base station 11 in step 1005. In step 1004, when threshold Qth3 is larger than Qp2, mobile station 21 requests the adjacent frequency in step 1006. Base station 11 determines the carrier frequency to be allocated in response to the request from mobile station 21, and reports the carrier frequency to be allocated to mobile station 21. Mobile station 21 receives the allocation report in step 1007.

Then, mobile station 21 starts communication using the carrier frequency reported from base station 11 in step 1008. During the communication with base station 11, mobile station 21 measures the received power of the perch channel of each base stations 61 to 63 of cellular system B in step 1009, and adopts the received power of the perch channel of the base station closest to mobile station 21 as Qp2. The base station closest to mobile station 21 exhibits the largest received power. Next, mobile station 21 in step 1010 decides whether or not received power Qp2 is larger than threshold Qth1. In step 1010, when received power Qp2 is larger than threshold Qth1, mobile station 21 in step 1011 decides whether or not the adjacent carrier frequency is being used. In step 1011, if the adjacent carrier frequency is being used, mobile station 21 requests the allocation of the non-adjacent carrier frequency from base station 11 in step 1012.

In step 1010, when received power Qp2 is equal to or less than threshold Qth1, mobile station 21 in step 1013 decides whether or not threshold Qth3 is larger than received power Qp2. In step 1013, when threshold Qth3 is larger than received power Qp2, mobile station 21 decides in step 1014 whether or not the non-adjacent carrier frequency is being used.

In step 1014, when the non-adjacent carrier frequency is being used, mobile station 21 reports to base station 11 in step 1015 that the adjacent carrier frequency can be used. In the case where the carrier frequency is changed, base station 11 reports to mobile station 21 the determination of the change.

Then, in step 1016, mobile station 21 decides whether or not the report for changing the carrier frequency is received. In step 1016, when the report for changing the carrier frequency is received, mobile station 21 changes the carrier frequency now in use to the carrier frequency reported, in step 1017.

Finally, in step 1018, mobile station 21 decides whether or not the communication has been terminated, and if the communication has not been terminated, mobile station 21 continues the communication and iterates the procedure from step 1009.

Next, an operation at the time of the frequency allocation of base station 11 in this embodiment will be described with reference to FIG. 13. An operation in changing the carrier frequency of base station 11 in this embodiment is the same as that of base station 11 in the first embodiment described by FIG. 8, and descriptions for it are omitted.

Upon receipt of the request for the carrier frequency allocation from mobile station 21 in step 601, base station 11 decides in step 602 whether the request for the carrier frequency allocation is for the non-adjacent carrier frequency and the adjacent carrier frequency, or for either the non-adjacent carrier frequency or the adjacent carrier frequency.

Then, when the request for the carrier frequency allocation received from mobile station 21 in step 602 is for the adjacent carrier frequency, base station 11 determines the allocation of the adjacent carrier frequency in step 606, and transmits the report of the carrier frequency allocation to mobile station 21 in step 605.

Operations other than those described above are the same as those of the flow chart of FIG. 7, and description for them are omitted.

In this embodiment, a method for setting threshold Qth1 is the same as that of the first embodiment. Furthermore, third threshold Qth3 is set to be a smaller value than that of Qth1.

According to this embodiment, since the adjacent carrier frequency is allocated to a mobile station where Qp2 is fairly smaller than the first threshold and the non-adjacent carrier frequency is allocated to a mobile station where Qp2 is close to the first threshold, a frequency of the carrier frequency change can be reduced while preventing the interference of adjacent frequencies similarly to the first embodiment.

Seventh Embodiment

Next, a method of preventing interference of adjacent frequencies in a cellular system according to a seventh embodiment of the present invention will be described.

This embodiment is applied to the cellular system shown in FIG. 2 similarly to the third embodiment and is different from the third embodiment only in the following points.

In the third embodiment, when received power Qp2 does not exceed the sum of threshold Qth2 and received power Qp1 and the difference between the received power Qp2 and the sum is small, if the adjacent carrier frequency is allocated, there may be a possibility that the change of the carrier frequency will immediately occur.

In order to solve such problem, in this embodiment a carrier frequency requested is selected using threshold Qth4 smaller than threshold Qth2 in addition to the threshold in the third embodiment.

When received power Qp2 is larger than the sum of threshold Qth2 and threshold Qp1, the mobile station in this embodiment uses the non-adjacent carrier frequency, and when received power Qp2 is smaller than the sum of threshold Qth4 and threshold Qp1, mobile station preferentially uses the adjacent carrier frequency. When received power Qp2 is between the sum of thresholds Qth4 and received power Qp1 and the sum of thresholds Qth2 and received power Qp1, mobile station uses any of all of the carrier frequencies.

Specifically, in the case where a possibility of an occurrence of the carrier frequency change is low, the mobile station in this embodiment uses the adjacent carrier frequency as possible and reduces a frequency of the carrier frequency change.

Figure 14:
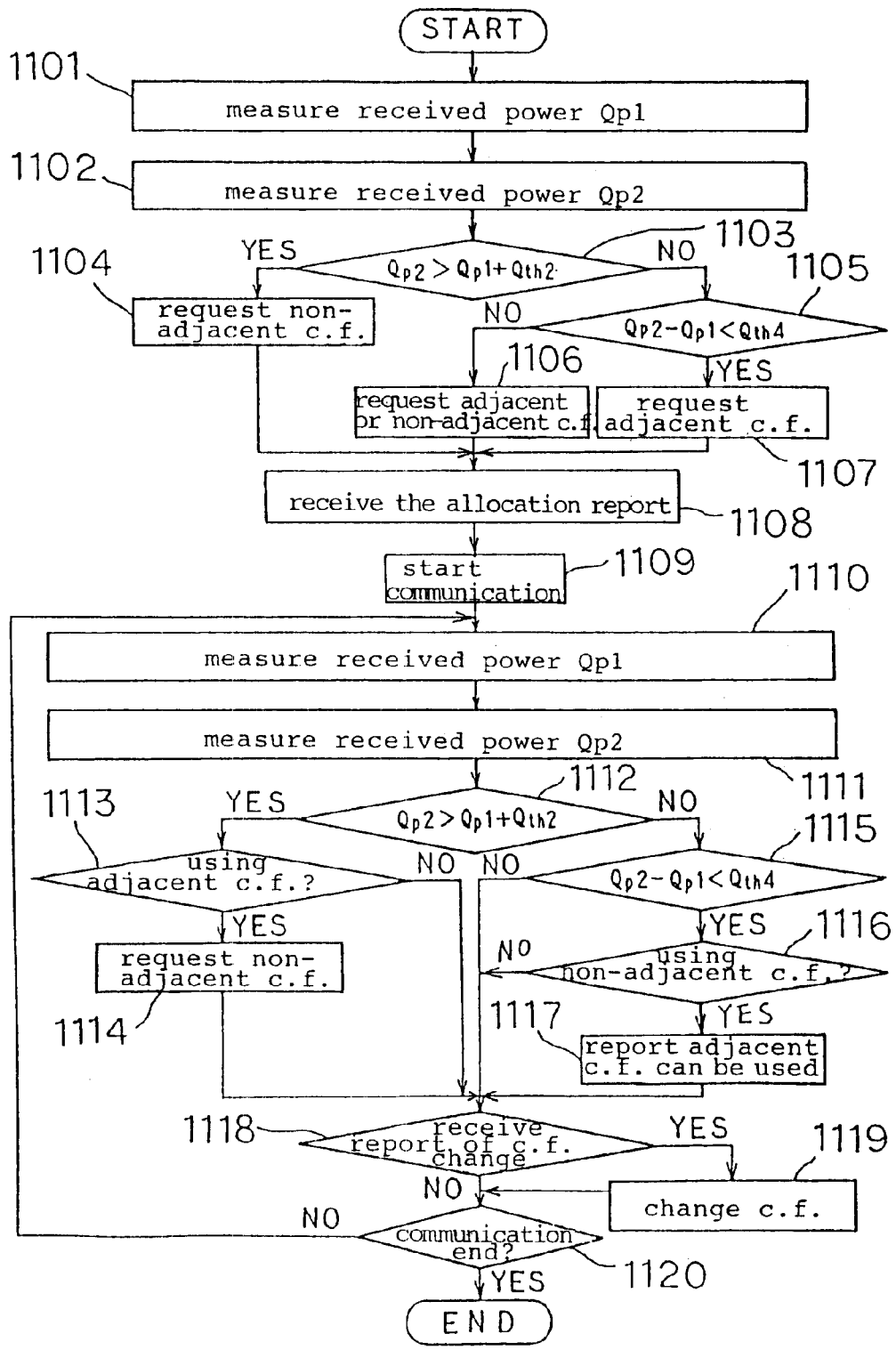
FIG. 14 is a flowchart showing an operation of a mobile station according to a seventh embodiment according to the present invention.

FIG. 14 is a flow chart showing an operation at the time when mobile station 21 set a signal of the uplink channel and performs communication.

Figure 13:
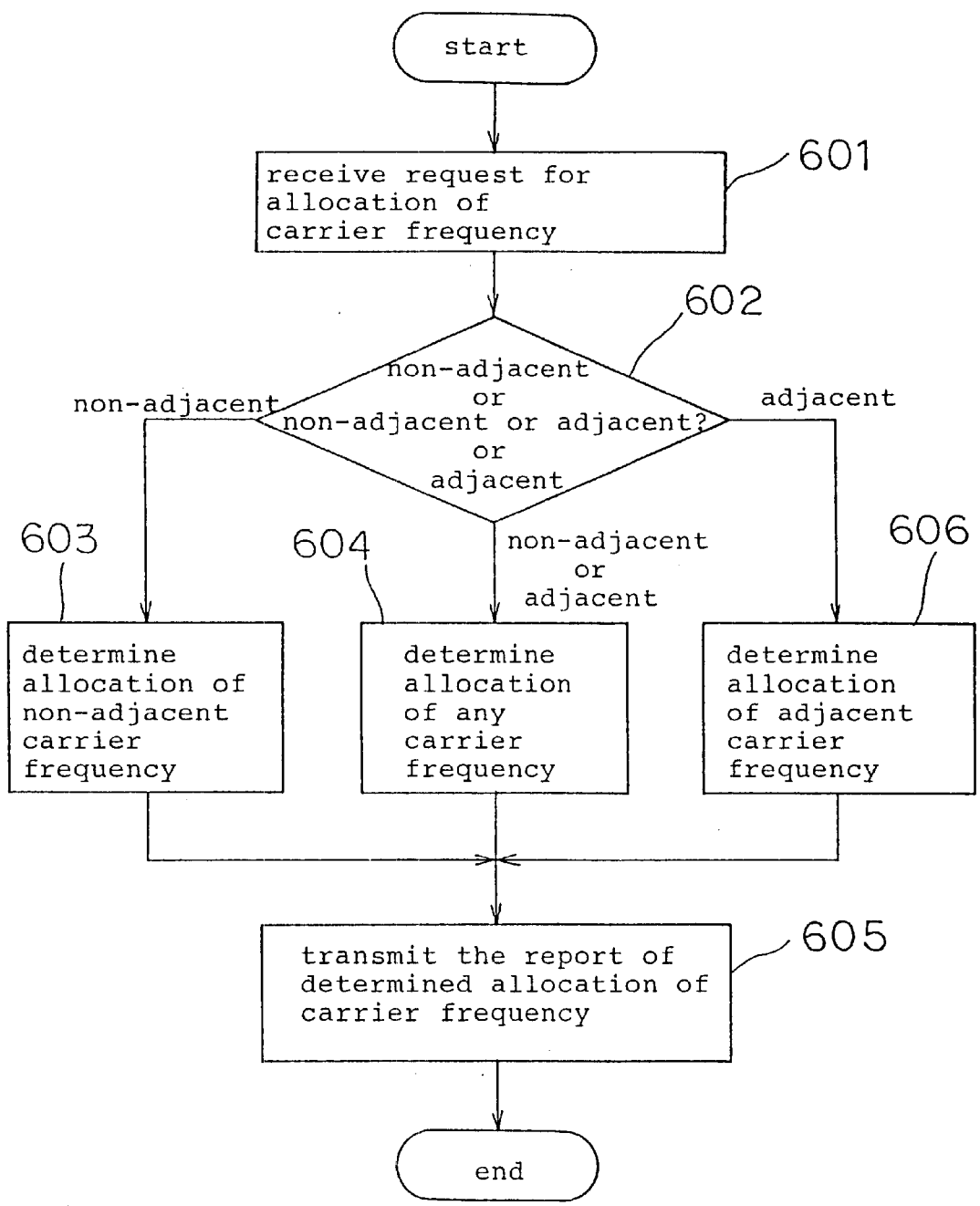
FIG. 13 is a flowchart showing a frequency allocation operation of a base station according to the sixth embodiment according to the present invention.

An operation of base station 11 in this embodiment is the same as that of that of base station 11 in the sixth embodiment described by the flow chart of FIGS. 8 and 13, and descriptions for it are omitted.

When a request for communication with base station 11 occurs, mobile station 21 measures received power Qp1 of a perch channel of base station 11 in cellular system A in step 1101, and, in step 1102, further measures received Qp2 of a perch channel of base station 61 in cellular system B. In step 1103, mobile station 21 decides whether or not received power Qp2 is larger than a sum of received power Qp1 and threshold Qth2. When received power Qp2 is larger than the sum of received power Qp1 and threshold Qth2 in step 1103, mobile station 21 requests a non-adjacent carrier frequency which is not adjacent to carrier frequencies Fb1 to Fb3 of cellular system B from base station 11 in step 1104. At this time, base station 11 determines the allocation of Fa1 or Fa2 which is not adjacent to carrier frequency Fb1 as a signal of the uplink channel, and reports information concerning the allocation to mobile station 21.

On the other hand, also when received power Qp2 is equal to or less than the sum of received power Qp1 and threshold Qth2 in step 1103, mobile station 21 in step 1105 decides whether or not fourth threshold Qth4 is larger than a difference between received powers Qp2 and Qp1. In step 1105, when the difference between received powers Qp2 and Qp1 is equal to or less than fourth threshold Qth4, mobile station 21 requests a non-adjacent frequency or an adjacent frequency from base station 11 in step 1106. In step 1105, when fourth threshold Qth4 is larger than the difference between received powers Qp2 and Qp1, mobile station 21 requests the adjacent carrier frequency from base station 11 in step 1107.

Base station 11 determines a carrier frequency to be allocated in response to the request from mobile station 21, and mobile station 21 receives the allocation report in step 1108.

Then, in step 1109, mobile station 21 starts communication using the carrier frequency reported from base station 11 in step 1109. Even during the communication with base station 11, mobile station 21 measures received power Qp1 of the perch channel of base station 11 from which a channel is established thereto in step 1110. Then, mobile station 21 measures also the received power of the perch channel of each base stations 61 to 63 in cellular system B in step 1111, and adopts as Qp2 the received power of the perch channel of the base station closest to mobile station. This base station closest to the mobile station exhibits the largest received power.

Then, in step 1112, mobile station 21 decides whether or not received power Qp2 is larger than the sum of received power Qp1 and threshold Qth2. In step 1112, when received power Qp2 is larger than the sum of the received power Qp1 and threshold Qth2, mobile station 21 in step 1113 decides whether or not the adjacent carrier frequency is being used. In step 1113, when the adjacent carrier frequency is being used, mobile station 21 requests an allocation of a non-adjacent carrier frequency from base station 11 in step 1114. When base station 11 receives the request of the allocation, base station 11 determines the allocation of the carrier frequency to a signal of the uplink channel from carrier frequencies Fa1 and Fa2, and reports information about the allocation to mobile station 21. In step 1112, when received power Qp2 is equal to or less than the sum of received power Qp1 and threshold Qth2, mobile station 21 in step 1115 decides whether or not fourth threshold Qth4 is larger than the difference between received powers Qp2 and Qp1. In step 1115, when threshold Qth4 is larger than the difference between received powers Qp2 and Qp1, mobile station 21 decides in step 1116 whether or not the non-adjacent carrier frequency is being used. In step 1116, when the non-adjacent carrier frequency is being used, mobile station 21 reports to base station 11 that the adjacent carrier frequency can be used, in step 1117.

In step 1118, mobile station 21 decides whether or not the report of the carrier frequency change is received. In step 1118, when the report of the carrier frequency change is received, mobile station 21 changes the carrier frequency now in use to the carrier frequency reported in step 1119. In step 1120, mobile station 21 decides whether or not the communication has been terminated, and if the communication has not been terminated, mobile station 21 continues the communication and repeats the operation from step 1110.

When the non-adjacent carrier frequency is used for a signal of the uplink channel, also as a signal of the downlink channel used is Ga1 or Ga2 which is a carrier frequency which is not adjacent to the carrier frequency of cellular system B. Furthermore, when the adjacent carrier frequency is used for a signal of the uplink channel, a signal of the downlink channel is selected among received powers Ga1 to Ga3, and used.

A method of setting threshold Qth2 in this embodiment is the same as that of the third embodiment. In addition, threshold Qth4 is set to be smaller than threshold Qth2.

According to this embodiment, the interference of adjacent frequencies can be prevented similarly to the third embodiment. Moreover, when received power Qp2 is fairly smaller than the sum of the received power Qp1 and second threshold Qth2 during the use of the adjacent carrier frequency, mobile station moves during communication, whereby received power Qp2 comes to be larger than the sum of received power Qp1 and second threshold Qth2. Hence, a necessity to change the carrier frequency would be less, compared to the case where received power Qp2 is close to the sum of the received power Qp2 and second threshold Qth2.

In this embodiment, the adjacent carrier frequency is allocated to a mobile station in which received power Qp2 is fairly small compared to the sum of the received power Qp1 and second threshold Qth2, and the non-adjacent carrier frequency is allocated to a mobile station in which received power Qp2 is close to the sum of received power Qp1 and second threshold Qth2. Therefore, a frequency of the carrier frequency change can be reduced while preventing the interference of adjacent frequencies similarly to the third embodiment.

Eighth Embodiment

Next, a method of preventing interference of adjacent frequencies in a cellular system according to an eighth embodiment of the present invention will be described.

In this embodiment, the mobile station comprises a movement speed estimator (not shown), and this embodiment is the same as the first to seventh embodiments except that when a movement speed of the mobile station is larger than a certain threshold speed, the non-adjacent carrier frequency is allocated in spite of the fact that the adjacent carrier frequency it is used.

Upon the movement of the mobile station, the received power of the perch channel varies in a short cycle by phasing. The movement speed estimator obtains the median of the received power, while receiving the received power of the perch channel of base station 11 with which a channel is to be established. Then, the movement speed estimator counts the number of times of crossing of the received power value over its median, whereby the movement speed of the mobile station is estimated.

In the beginning of communication between base station 11 and mobile station 21, when the estimated movement speed is larger than the threshold speed, mobile station 21 requests an allocation of a non-adjacent carrier frequency, and base station 11 allocates carrier frequency Fa1 or Fa2 to an uplink channel, which is the non-adjacent carrier frequency. On the other hand, when the estimated movement speed is equal to or less than the threshold speed, base station 11 sets the carrier frequency and performs the communication by the method of the seventh embodiment, as described with reference to FIG. 14.

According to this method, a frequency of the carrier frequency can be reduced, while preventing the interference of adjacent frequencies similarly to the seventh embodiment. When the movement speed of the mobile station is high during the usage of the adjacent carrier frequency, the amount of the variation of received powers Qp1 and Qp2 during the communication is large. Therefore, received power Qp2 will be larger than the sum of received power Qp1 and second threshold Qth2 due to the movement of the mobile station during the communication, so that a possibility that the carrier frequency change is required is comparatively large. In this embodiment, because the non-adjacent carrier frequency is allocated to such mobile station, the frequency of the carrier frequency change can be more reduced.

Ninth Embodiment

Next, a method of preventing interference of adjacent frequencies in a cellular system according to a ninth embodiment of the present invention will be described.

Figure 15:
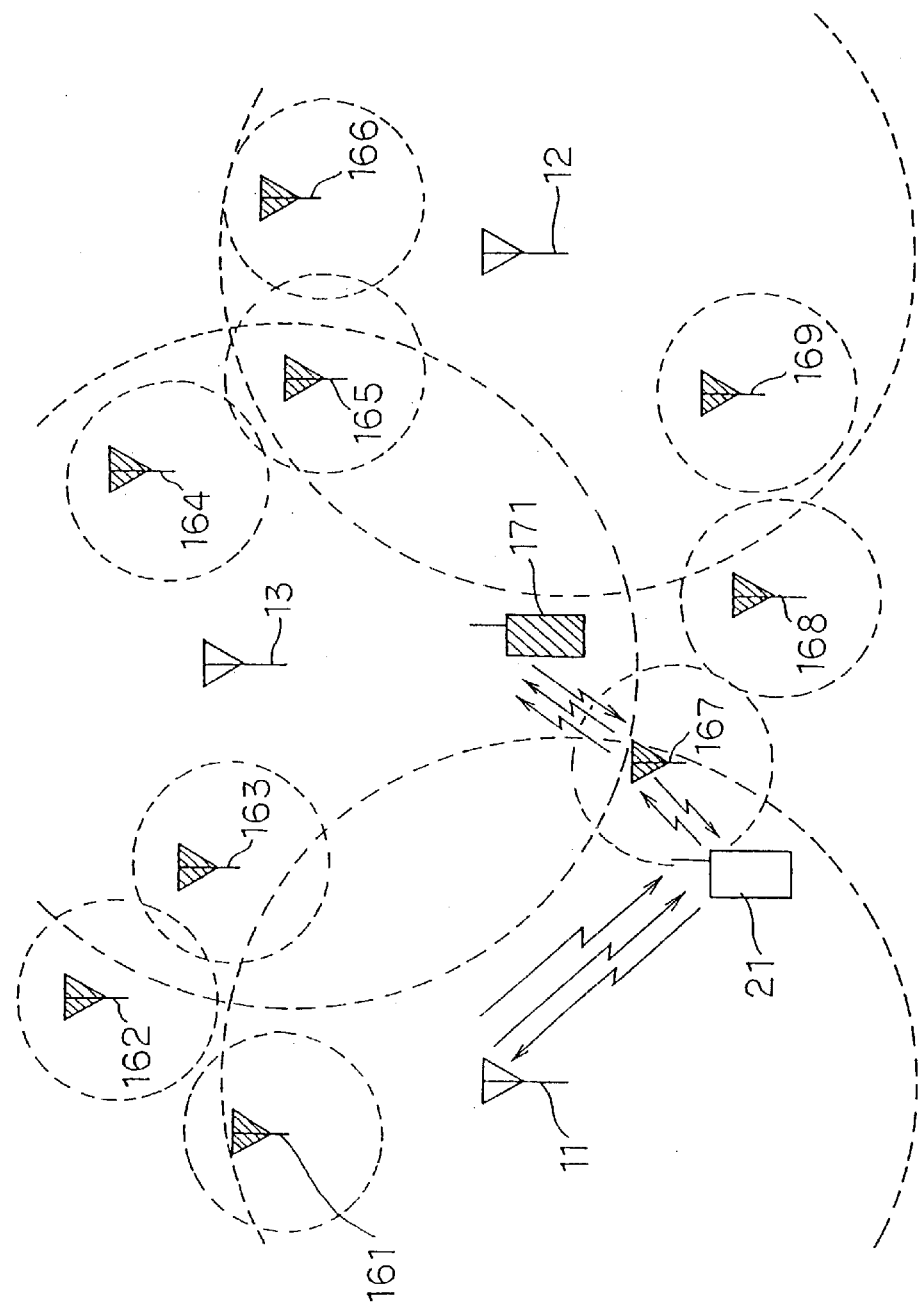
FIG. 15 is showing a configuration of a cellular system according to a ninth embodiment according to the present invention.

The method of preventing interference of adjacent frequencies in a cellular system according to the ninth embodiment is applied to the cellular system shown in FIG. 15. The same reference numerals as those in FIG. 2 show the identical components.

In the cellular system of FIG. 15, compared to the cellular system shown in FIG. 2, a cellular system C composed of base stations 161 to 169 and mobile station 171 is provided, instead of the cellular system B composed of base stations 61 to 63 and mobile station 71.

The cellular system C is a micro cellular system, and transmission outputs of base stations 161 to 169 are greatly decreased, compared to base stations 11 to 13 constituting the macro cellular system.

This embodiment is the same as the first to eighth embodiments except for the above-described portions. As described above, the two cellular systems including the macro cellular system and the micro cellular system exist in the same service area, and even when the sizes of them are different, the interference of adjacent frequencies can be prevented.

Tenth Embodiment

Next, a method of preventing interference of adjacent frequencies in a cellular system according to a tenth embodiment of the present invention will be described.

Figure 16:
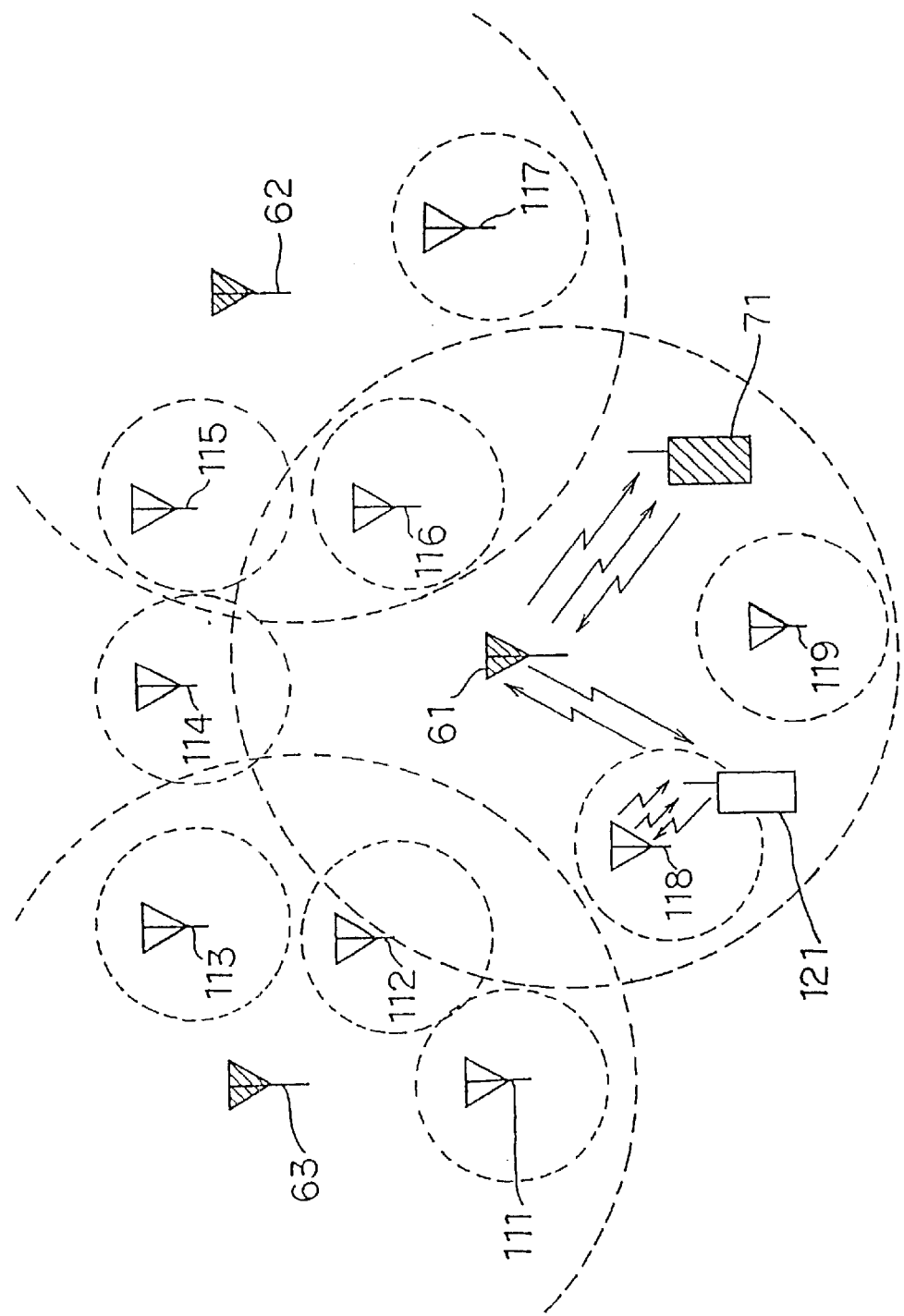
FIG. 16 is showing a configuration of a cellular system according to a tenth embodiment according to the present invention.

The method according to this embodiment is applied to the cellular system assuming the structure shown in FIG. 16. The same reference numerals as those in FIG. 2 show the same components.

In the cellular system of FIG. 16, compared to the cellular system shown in FIG. 2, a cellular system D composed of base stations 111 to 119 and mobile station 121 is provided, instead of the cellular system A composed of base stations 11 to 13 and mobile station 21.

The cellular system D is a micro cellular system, and transmission outputs of base stations 111 to 119 are greatly decreased, compared to base stations 61 to 63 constituting the macro cellular system.

This embodiment is the same as the first to eighth embodiments except for the above-described portions. As described above, the two cellular systems including the macro cellular system and the micro cellular system exist in the same service area, and even when the sizes of them are different, the interference of adjacent frequencies can be prevented.

Eleventh Embodiment

Next, a method of preventing interference of adjacent frequencies in a cellular system according to an eleventh embodiment of the present invention will be described.

The method according to this embodiment is applied to the cellular system of FIG. 2, and carrier frequencies Fa1 to Fa3 are allocated to signals of the uplink channel of cellular system A; carrier frequencies Ga1 to Ga3, signals of the downlink channel thereof; carrier frequencies Fb1 to Fb3, signal of the uplink channel of cellular system B; and carrier frequencies Gb1 to Gb3, signals of the downlink channel thereof.

In cellular system A, it is assumed that while as the signal of the uplink channel, carrier frequencies Fa1 to Fa3 are set in base stations 11 and 13, only carrier frequencies Fa1 and Fa2 are set in base station 12. On the other hand, it is assumed that while as signals of the downlink channel, carrier frequencies Ga1 to Ga3 are set in base stations 11 and 13, only carrier frequencies Ga1 and Ga3 are set in base station 12.

In cellular system B, it is assumed that as signals of the uplink channel, only carrier frequencies Fb2 and Fb4 are set in base station 61, and only carrier frequencies Fb1 to Fb3 are set in base stations 62 and 63. On the other hand, it is assumed that while as signals of the downlink channel, carrier frequencies Gb2 and Gb3 are set in base stations 61, only carrier frequencies Gb1 to Gb3 are set in base stations 62 and 63.

In this embodiment, when the mobile station of cellular system A selects the signal of the uplink channel, the mobile station measures the received power of the perch channel transmitted from a base station of cellular system B, and a base station in which carrier frequency Fb1 adjacent to a signal of the uplink channel of cellular system A is not set is excluded as an object to be measured.

Since in base station 61, carrier frequency Fb1 is not set, mobile station 21 excludes the received power of the perch channel of base station 61 as objects to be measured, and since base stations 62 and 63 use carrier frequency Fb1, mobile station 21 measures the received power of the perch channel of each of these base stations, and selects and uses a signal of the uplink channel similarly to the first embodiment.

Furthermore, with reference to the downlink channel, when carrier frequencies Fa1, Fa2 and Fa3 are used in the uplink channel, the set of carrier frequencies Ga1, Ga2 and Ga3 is used.

This embodiment is the same as the first embodiment except for the above-described portions.

According to this method, among the base stations of cellular B, with respect to a base station using no signal adjacent to a carrier frequency of a signal used by cellular system A, a carrier frequency is selected without measuring a received power of its perch channel. However, there is no possibility that the mobile station gives the interference of adjacent frequencies to such base station. Moreover, with regard to other base stations, the application of the interference of adjacent frequencies can be prevented similarly to the first embodiment.

In this embodiment, base stations 12 and 61 are supposed as base stations provided in the suburbs where the volume of traffic is small. In areas where the volume of traffic is small, a problem that all channels come to be busy hardly occurs in spite of decreasing the number of carrier frequencies used. For this reason, the measurement of the received power of the perch channel can be omitted by a limitation of the carrier frequencies which are set only to specified base stations like this embodiment.

Twelfth Embodiment

Next, a method of preventing interference of adjacent frequencies in a cellular according to a twelfth embodiment of the present invention will be described.

This embodiment is equivalent to the first embodiment except that setting of the carrier frequency is different from that of the first embodiment.

Figure 17:
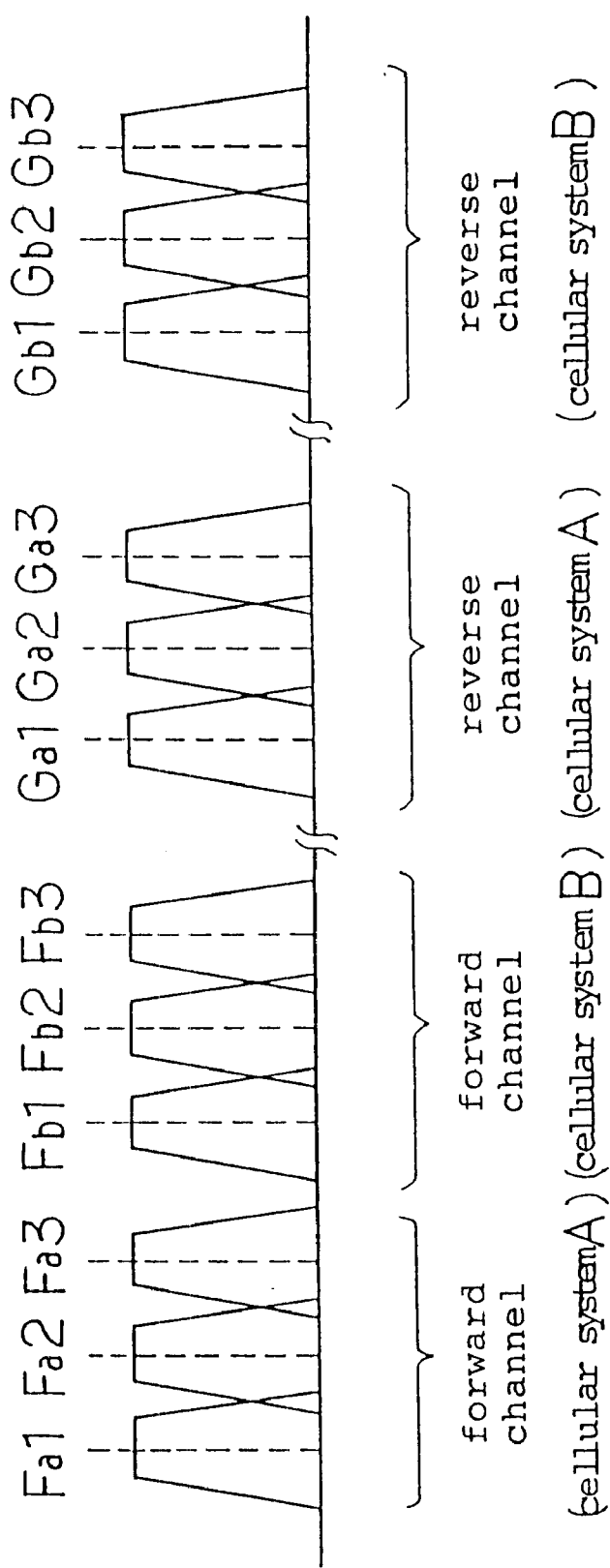
FIG. 17 is an explanatory view of frequency arrangement in a cellular system according to a twelfth embodiment according to the present invention.

In this embodiment, the carrier frequencies shown in FIG. 17 are set in cellular systems A and B.

Among the carrier frequencies shown in FIG. 17, in cellular system A, carrier frequencies Fa1 to Fa3 are allocated for signals of the uplink channel, and the carrier frequencies Ga1 and Ga3 are allocated for signals of the downlink channel. On the other hand, in cellular system B, carrier frequencies Fb1 to Fb3 are allocated for signals of the uplink channel, and carrier frequencies Gb1 and Gb3 are allocated for signals of the downlink channel.

While carrier frequency Fa3 of the uplink channel of cellular system A and carrier frequency Fb1 of the uplink channel of cellular system B are adjacent to each other, the signals on downlink channel of cellular system A and the signals of the downlink channel of cellular system B are apart from each other.

Also in the case where though the frequency bands belonging to the different cellular systems are not adjacent to each other of the downlink channel, the frequency bands belonging to the different cellular systems are adjacent to each other of the uplink channel, the interference of adjacent frequencies can be prevented perfectly similar to the first embodiment.

Thirteenth Embodiment

Next, a method of preventing interference of adjacent frequencies in a cellular system according to a thirteenth embodiment according to the present invention will be described.

In the first to twelfth embodiments, the interference of adjacent frequencies applied to the base station by the mobile station is prevented by selectively using the carrier frequencies of the uplink channel. In this embodiment, by selectively using the carrier frequencies of the downlink channel, the interference of adjacent frequencies applied to the mobile station by the base station is prevented.

Generally, since a transmitter of the base station exhibits a higher suppression degree for a leakage power to a signal of an adjacent frequency compared to a transmitter of the mobile station, the interference of adjacent frequencies by the downlink channel is not a severe problem as long as the interference of adjacent frequencies by the uplink channel is prevented by monitoring. However, in some cases, in the case where the suppression degree for the leakage power of the transmitter of the base station is low, a possibility that the interference of adjacent frequencies by the downlink channel will be a problem is expected.

In this embodiment, compared to the first embodiment, mobile station 21 uses threshold Qmth1 instead of threshold Qth1, and when received power Qp2 exceeds threshold Qmth1, mobile station 21 changes the carrier frequency of communication channel 41 of the downlink channel, and the interference of adjacent frequencies from base station 61 is prevented.

A method for obtaining threshold Qmth1 will be described below.

Hereupon, an interference of adjacent frequencies signal power from base station 61 in mobile station 21 is denoted as Qmintf, and a suppression amount for a leakage power to an adjacent frequency is denoted as Absadj. Pbs2 denotes a transmission power of base station 61. Values other than these are the same as those of the first embodiment.

When a transmitter of base station 61 is structured so that a power of the interference of adjacent frequencies from carrier frequency Gb1 to carrier frequency Gb3 in mobile station 21 is smaller by the suppression amount Absadj than a received power of carrier frequency Ga3 in mobile station 21, threshold Qmintf is computed by the following equation (16).

$$Qmintf = Pbs2 - L2 - Absadj \quad (16)$$
$$= Pbs2 - Pb2 + Qp2 - Absadj$$

When an allowable value of the interference of adjacent frequencies signal power of base station 61 is denoted as Qmintfmax, the condition that the interference of adjacent frequencies signal power is equal to or less than the allowable value is expressed by the following equation (17).

$$Qmintfmax > Qmintf \quad (17)$$
$$> Pbs2 - Pp2 + Qp2 - Absadj$$

By rearranging the equation (17), the following equation (18) can be obtained.

$$Qp2 < Qmintfmax + Absadj + Pp2 - Pbs2 \quad (18)$$

Accordingly, even when a transmission power of the base station takes maximum value Pbsmax (maximum power value that can be transmitted by the base station), the condition that the power of the interference of adjacent frequencies is equal to or less than the allowable value is expressed by the equations (19) and (20).

$$Qp2 < Qmintfmax + Absadj + Pp2 - Pbsmax \quad (19)$$

$$Qmth1 = Qmintfmax + Absadj + Pp2 - Pbsmax \quad (20)$$

Moreover, the carrier frequency of the uplink channel is selectively used in order to prevent the interference of adjacent frequencies in the second to twelfth embodiment. Instead of this, if the carrier frequency of the downlink channel is selectively used similarly to the thirteenth embodiment, the interference of adjacent frequencies applied to the mobile station from the base station can be prevented.

In the above-described embodiments, though thresholds Qth3 and Qth4, and threshold speed are a fixed value previously determined, the present invention is not limited to this, these values are flexibly may be changed according to the number of mobile stations in a signal of each carrier frequency, a channel quality, an interference signal power, and the like.

Fourteenth Embodiment

Next, a method of preventing interference of adjacent frequencies in a cellular system according to a fourteenth embodiment of the present invention will be described.

In the foregoing first embodiment, mobile station 21 decides whether or not received power Qp2 of the perch channel of base station 61 is larger than threshold Qth1, and makes a report to change an adjacent or non-adjacent carrier frequency based on a measurement result. However, in this embodiment, a comparison of the received power Qp2 of the perch channel of base station 61 with threshold Qth1 is not made in mobile station 21, but the comparison is made in base station 11. Specifically, mobile station 21 measures received power Qp2, and reports the measurement value to base station 11. In base station 11, the comparison of the measurement value of received power Qp2 with threshold Qth1 is made.

Figure 18:
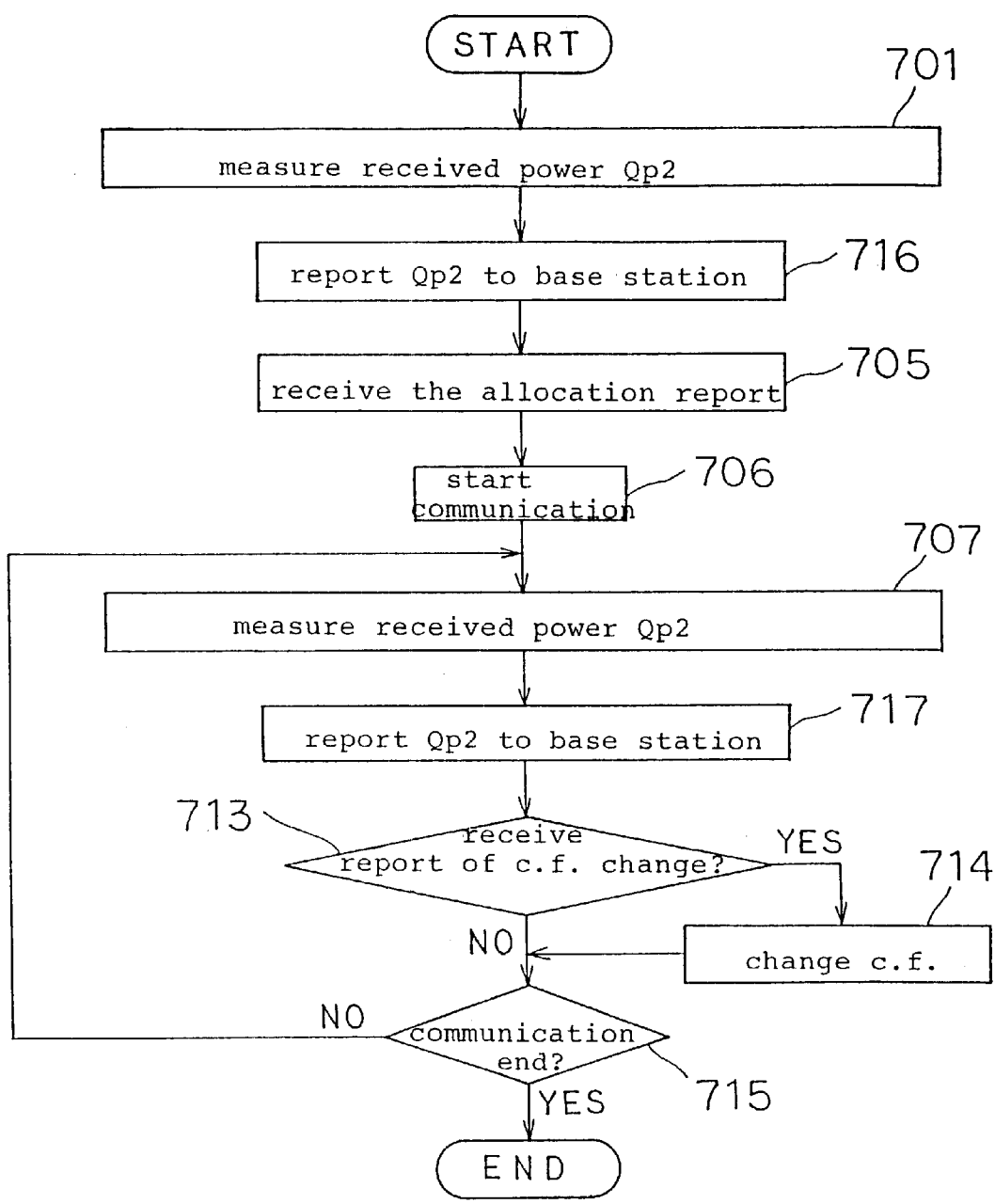
FIG. 18 is a flowchart showing an operation of a mobile station in a cellular system according to a fourteenth embodiment according to the present invention.
Figure 19:
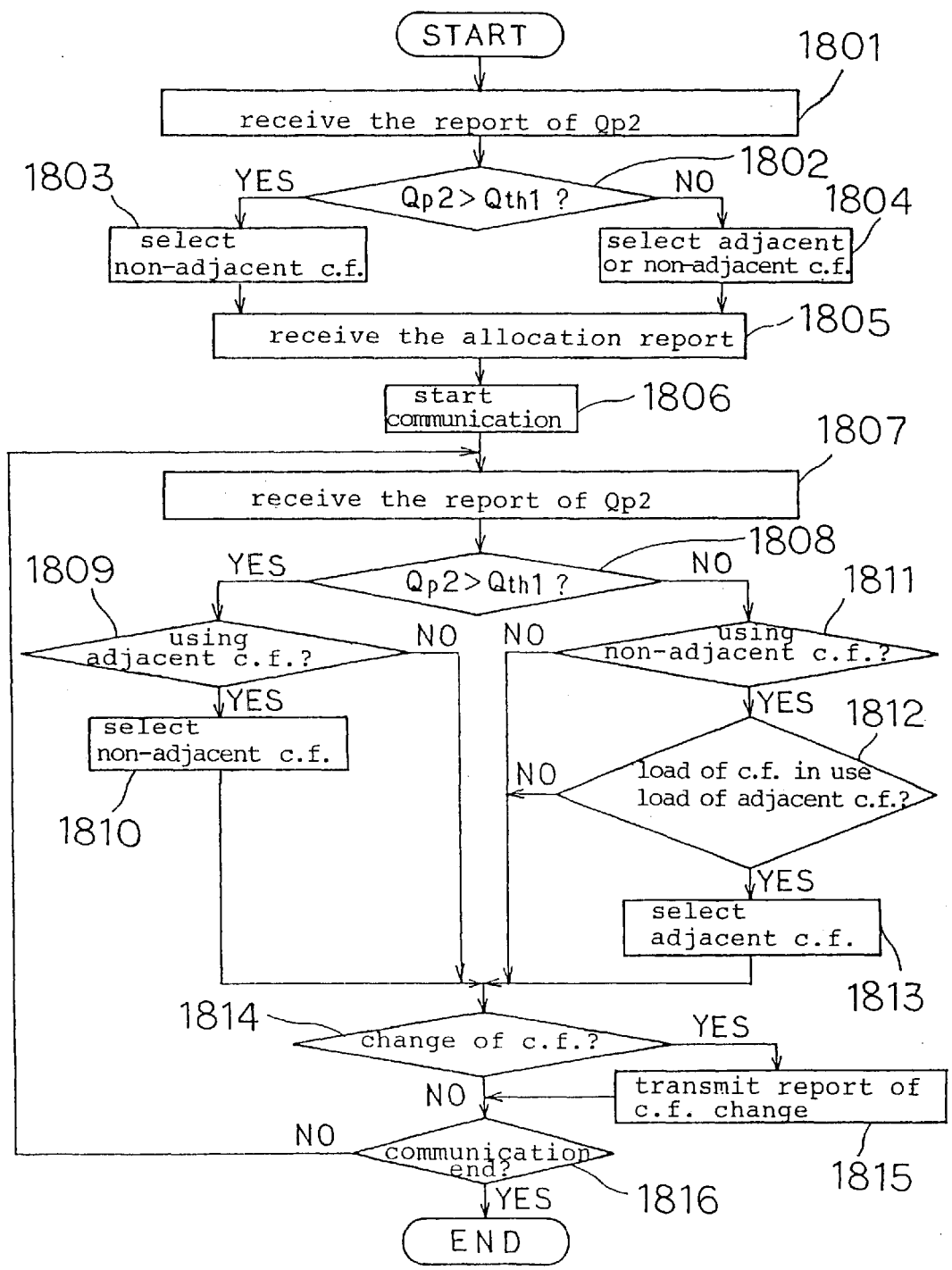
FIG. 19 is a flowchart showing an operation of a base station in a cellular system according to the fourteenth embodiment according to the present invention.

An operation of mobile station 21 in this embodiment is shown in the flowchart of FIG. 18, and an operation of base station 11 is shown in the flowchart of FIG. 19.

The flowchart of FIG. 18 comprises step 716 instead of steps 702 to 704 of FIG. 6, and comprises step 717 instead of steps 708 to 712 of FIG. 6. Other steps of FIG. 18 are the same procedures as those of FIG. 6.

First, the operation of mobile station 21 in this embodiment will be described with reference to FIG. 18.

When a request for communication with base station 11 occurs, mobile station 21 measures received power Qp2 of a perch channel of base station 61 in cellular system B in step 701. Subsequently, mobile station 21 reports received power Qp2 measured to base station 11 in step 716. Base station 11 determines the carrier frequency to be allocated based on received power Qp2 reported from mobile station 21, and reports it to mobile station 21. Mobile station 21 receives the allocation report in step 705.

Then, mobile station 21 starts the communication using the carrier frequency reported from base station 11 in step 706.

Subsequently, mobile station 21 measures received power Qp2 of a perch channel of each of base stations 61 to 63 even during the communication in step 707. In step 717, mobile station 21 reports to base station 11 the received power Qp2 of the perch channel of the base station closest to mobile station 21. In this base station, the received power is maximum.

Based on received power Qp2 reported from mobile station 21, base station 11 decides whether or not the carrier frequency now in use is to be changed, and when it is to be changed, base station 11 sends a carrier frequency change report to mobile station 21.

In step 713, when mobile station 21 receives the carrier frequency change report from base station 11, mobile station 21 change the carrier frequency now in use to the reported carrier frequency. Then, in step 715, mobile station 21 decides whether or not the communication is terminated, if the communication has been terminated, mobile station 21 finishes the procedure. If the communication has not been terminated, mobile station 21 iterates the foregoing procedure from step 707.

Subsequently, an operation of base station 11 in this embodiment will be described with reference to the flowchart of FIG. 19.

First, in step 1801, base station 11 receives the report concerning received power Qp2 sent from mobile station 21. This step 1801 corresponds to step 716 in FIG. 18. Then, in step 1802, base station 11 decides whether or not received power Qp2 is larger than threshold Qth1. When received power Qp2 is larger than threshold Qth1 in step 1802, base station 11 selects a non-adjacent carrier frequency in step 1803. In step 1802, when received power Qp2 is equal to or less than threshold Qth1, base station 11 selects either a non-adjacent carrier frequency or an adjacent carrier frequency in step 1804. Subsequently, base station 11 sends an allocation report for the selected carrier frequency to mobile station 21 in step 1805. This step 1805 corresponds to step 705 in FIG. 18.

Subsequently, in step 1806, base station 11 starts communication with mobile station 21 using the carrier frequency selected in base station 11.

Furthermore, as shown in step 707 of FIG. 18, mobile station 21 measures received power Qp2 of the perch channel of each of base station 61 to 63 in cellular system B even during the communication, and sends a measurement result of received power Qp2. Base station 11 receives the report concerning received power Qp2 in step 1807.

Then, in step 1808, base station 11 decides whether or not received power Qp2 received from mobile station 21 is larger than threshold Qth1. When received power Qp2 is larger than threshold Qth1 in step 1808, base station 11 decides whether or not the adjacent carrier frequency is being used, in step 1809. When the adjacent carrier frequency is being used in step 1809, base station 11 selects the non-adjacent carrier frequency in step 1810.

In step 1808, when received power Qp2 is equal to or less than threshold Qth1, base station 11 decides whether or not the non-adjacent carrier frequency is being used, in step 1811. In step 1811, when the non-adjacent carrier frequency is being used, the base station 11 decides whether or not a load of the carrier frequency now in use is larger than a load of the adjacent carrier frequency, in step 1812. In step 1812, when the load of the carrier frequency now in use is larger than the load of the adjacent carrier frequency, base station 11 selects the adjacent carrier frequency in step 1813.

Other than the foregoing described cases, base station 11 does not perform the change of the carrier frequency. In step 1814, base station 11 decides whether or not there is the change of the carrier frequency, and when there is the change of the carrier frequency, base station 11 sends a carrier frequency change report to mobile station 21. This step 1815 corresponds to step 713 in FIG. 18.

Finally, in step 1816, base station 11 decides whether the communication has been terminated, and if the communication has been terminated, base station 11 finishes the procedure. If the communication has not been terminated, base station 11 continues the communication, and iterates the foregoing procedure from step 1807.

The method of preventing interference of adjacent frequencies in a cellular system according to this embodiment will be described more concretely below.

The base station sends carrier selection rule information (i.e., information concerning a carrier frequency which the mobile station has an obligation to measure) by a BCCH (Broad Cast Channel; report channel), and the mobile station receives the carrier selection rule information from the base station. The mobile station and the base station select the carrier frequency based on the following procedure (a) to (i).

(a) When the mobile station starts communication with the base station, the mobile station measures received power of carrier frequencies directed by carrier selection rule information, and reports a measured result to the base station using a non-adjacent frequency (i.e., a carrier frequency which is not adjacent to a carrier frequency paired with the measured carrier frequency).

(b) The base station receives the measured result from the mobile station.

(c) When the measured received power is larger than a threshold, the base station selects an adjacent carrier frequency. When transmission power that is measured and received is equal to or less than the threshold, the base station randomly selects a carrier frequency which can be used among the allocated carrier frequencies.

(d) The base station sends a call-setup direction, and informs the mobile station of the selected carrier frequency.

(e) The mobile station starts communication using the selected carrier frequency.

(f) During the communication, the mobile station measures received power of carrier frequency as directed in the carrier selection rule information at a certain time interval, and reports the measured result to the base station.

(g) The base station received the measurement result from the mobile station.

(h) If the received power is larger than the threshold and the mobile station is using an adjacent carrier (i.e., a carrier frequency that is adjacent to a carrier frequency paired with the measured carrier frequency), the base station selects a non-adjacent carrier frequency, and informs the mobile station of an inter-frequency handover direction and the selected carrier frequency.

(i) When the mobile station receives the inter-frequency handover direction from the base station, the mobile station starts the inter-frequency handover for the selected carrier frequency.

Hereupon, the call-setup direction is a direction for setting a channel, and the inter-frequency handover is an operation to change a carrier frequency now in use to a different carrier frequency.

Fifteenth Embodiment

Next, a method of preventing interference of adjacent frequencies in a cellular system according to a fifteenth embodiment of the present invention will be described.

In the foregoing third embodiment, mobile station 21 decides whether or not received power Qp2 of the perch channel of base station 61 is larger than the sum of threshold Qth2 and received power Qp1 of the perch channel of base station 11, and mobile station 21 performs the report requesting either a non-frequency carrier frequency or, an adjacent carrier frequency based on the decision result. However, in this embodiment, the comparison of received power Qp2 of the perch channel of base station 61 with the sum of threshold Qth2 and received power Qp1 is not made in mobile station 21, but in base station 11. Specifically, mobile station 21 measures received power Qp2 and received power Qp1, and informs base station 11 of these values. The comparison of received power Qp2 with the sum of threshold Qth2 and received power Qp1 is made in base station 11.

Figure 20:
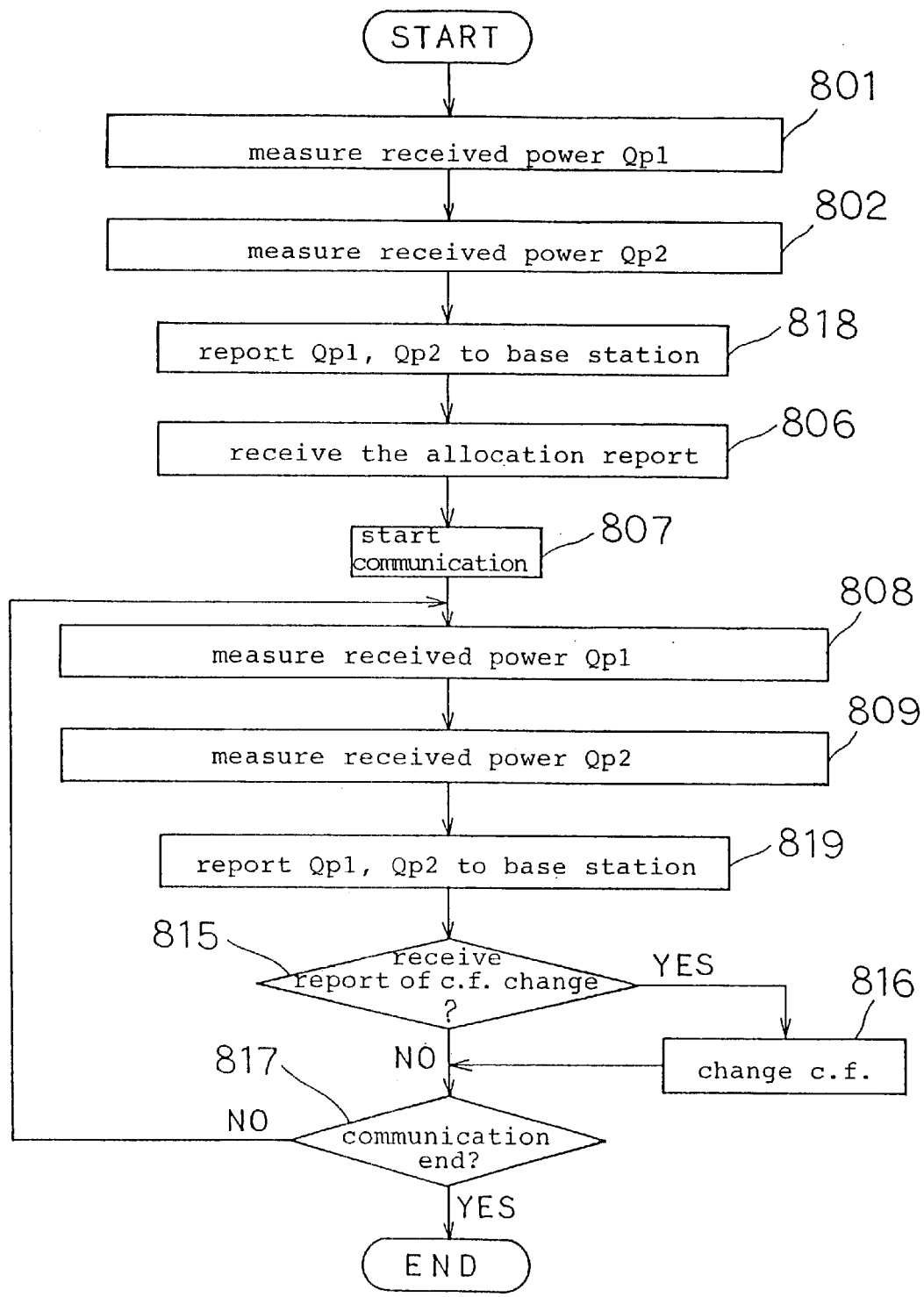
FIG. 20 is a flowchart showing an operation of a mobile station in a cellular system according to a fifteenth embodiment according to the present invention.
Figure 21:
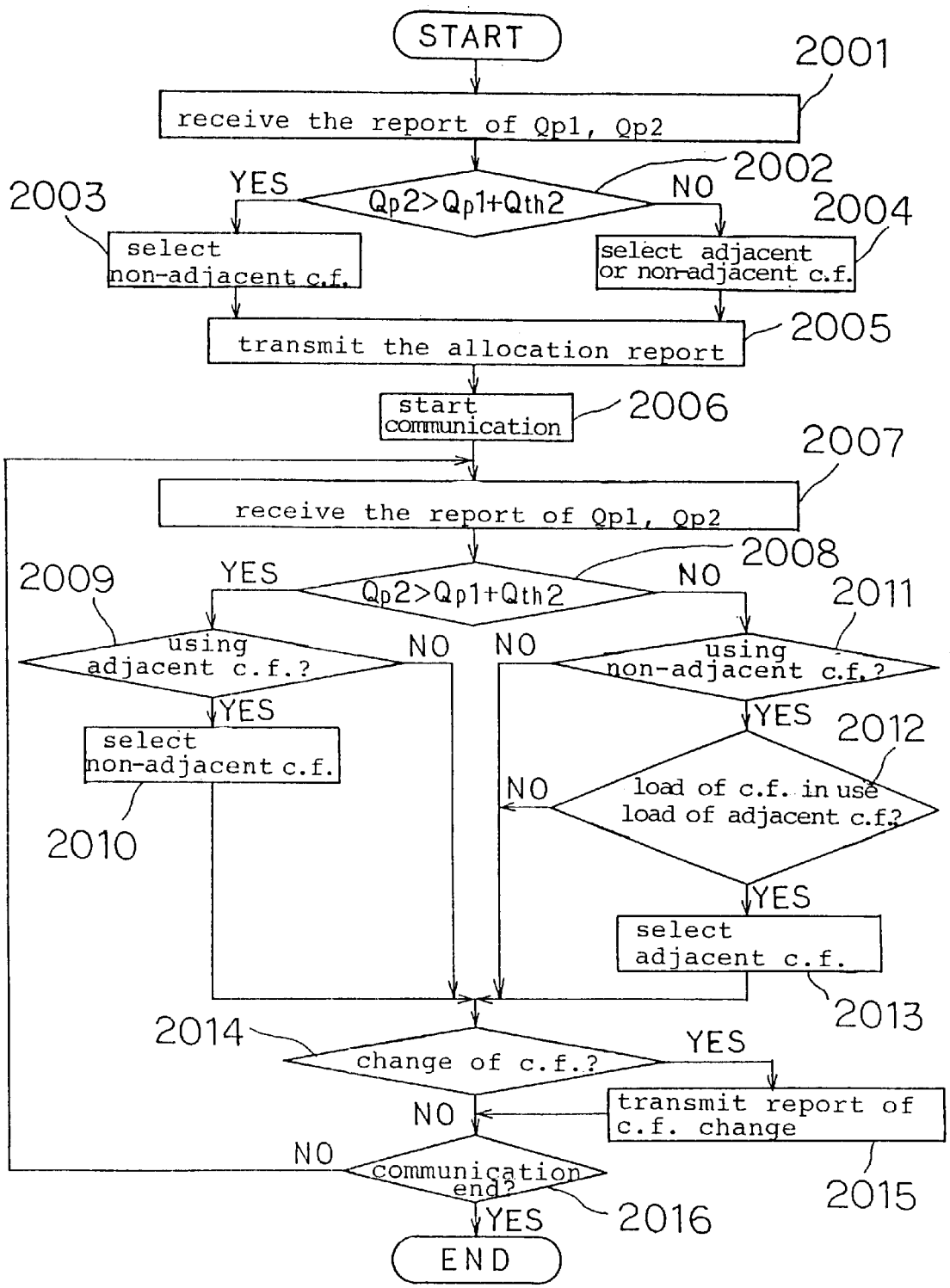
FIG. 21 is a flowchart showing an operation of a base station in a cellular system according to the fifteenth embodiment according to the present invention.

An operation of mobile station 21 in this embodiment is shown in the flowchart of FIG. 20, and an operation of base station 11 is shown in the flowchart of FIG. 21.

The flowchart of FIG. 20 comprises step 818 instead of steps 803 to 805 in the flowchart of FIG. 10, and comprises step 819 instead of steps 810 to 814 in the flowchart of FIG. 10. Other steps in the flowchart of FIG. 20 are the same procedures as those of FIG. 10.

First, the operation of mobile station 21 in this embodiment will be described with reference to FIG. 20.

When a request for communication with base station 11 occurs, mobile station 21 measures received power Qp1 of a perch channel of base station 11 in cellular system A in step 801, and further measures received power Qp2 of a perch channel of base station 61 in cellular system B in step 802. Subsequently, mobile station 21 informs base station 11 of the measured powers Qp1 and Qp2 in step 818.

Base station 11 determines a carrier frequency to be allocated based on received powers Qp1 and Qp2 informed from mobile station 21 and informs mobile station 21 of it. Mobile station 21 receives its allocation report in step 806.

In step 807, mobile station 21 starts communication using the carrier frequency informed from base station 11. Subsequently, in step 808, mobile station 21 measures received power Qp1 of a perch channel of base station 11 in cellular system A even during the communication, and mobile station 21 further measures received power Qp2 of a perch channel of each of base stations 61 to 63 in cellular system B in step 809. Then, in step 819, mobile station 21 informs base station 11 of the measured received powers Qp1 and Qp2.

Based on the received powers Qp1 and Qp2 informed from mobile station 21, base station 11 determines whether or not the carrier frequency now in use is to be changed. If the carrier frequency is changed, base station 11 sends a carrier frequency change report to mobile station 21.

In step 815, mobile station 21 decides whether or not the carrier frequency change report from base station 11 has been received. If mobile station 21 has received the carrier frequency change report from base station 11 in step 815, mobile station 21 changes the carrier frequency now in use to the carrier frequency reported in step 816. Then, in step 817, mobile station 21 decides whether or not the communication has been terminated, if the communication has been terminated, the mobile station 21 finishes the procedure. If the communication has not been terminated, mobile station 21 repeats the foregoing procedures from step 808.

Next, the operation of base station 11 in this embodiment will be described with reference to the flowchart of FIG. 21.

First, in step 2001, base station 11 receives the report concerning received powers Qp1 and Qp2 sent from mobile station 21. This step 2001 corresponds to step 818 in FIG. 20. Then, in step 2002, base station 11 decides whether or not received power Qp2 is larger than a sum of received power Qp1 and threshold Qth2. In step 2002, if received power Qp2 is larger than the sum of received power Qp1 and threshold Qth2, base station 11 selects a non-carrier frequency in step 2003. In step 2002, if received power Qp2 is equal to or less than the sum of received power Qp1 and threshold Qth2, base station 11 selects either an adjacent carrier frequency or an adjacent carrier frequency in step 2004.

In step 2005, base station 11 sends an allocation report concerning the selected carrier frequency to mobile station 21. This step 2005 corresponds to step 806 in FIG. 20. Then, in step 2006, base station 11 starts communication with mobile station 21 using the carrier frequency selected in base station 11.

As is shown in step 808 of FIG. 20, mobile station 21 measures received power Qp1 of a perch channel of base station 11 in cellular system A even during the communication and sends it. As is shown in step 809, mobile station 21 measures received power Qp2 of a perch channel of each of base stations 61 to 63 in cellular system B and sends them. For this reason, in step 2007, base station 11 receives the reports concerning received powers Qp1 and Qp2.

In step 2008, base station 11 decides whether or not received power Qp2 that has been received is larger than a sum of received power Qp1 and threshold Qth2. If received power Qp2 is a larger than the sum of received power Qp1 and threshold Qth2 in step 2008, in step 2009 base station 11 decides whether or not an adjacent carrier frequency is being used. If the adjacent carrier frequency is being used in step 2009, base station 11 selects a non-adjacent carrier frequency in step 2010.

If received power Qp2 is equal to or less than the sum of received power Qp1 and threshold Qth2 in step 2008, in step 2011 base station 11 decides whether or not the non-adjacent carrier frequency is being used. If the non-adjacent carrier frequency is being used in step 2011, in step 2012 base station 11 decides whether or not a load of the carrier frequency now in use is larger than a load of the adjacent carrier frequency. If the load of the carrier frequency now in use is larger than the load of the adjacent carrier frequency in step 2012, base station 11 selects the adjacent carrier frequency in step 2013.

Besides the foregoing described cases, base station 11 does not perform the change of the carrier frequency. In step 2014, base station 11 decides whether or not there is a change of the carrier frequency. If there is a change of the carrier frequency, base station 11 sends a carrier frequency change report to mobile station 21 in step 2015. The step 2015 corresponds to step 815 in FIG. 20.

In step 2016, base station 11 decides whether or not the communication has been terminated. If the communication has been terminated, base station 11 finishes the procedure. If the communication has not been terminated, base station 11 continues the communication, and repeats the foregoing procedures from 2007.

In this embodiment, it is satisfactory that mobile station 21 reports a difference between received powers Qp1 and Qp2 to base station 11 instead of reporting received powers Qp1 and Qp2 to base station 11. In this case, steps 2002 and 2008 will be the procedures for comparing Qth2 with Qp2−Qp1.

In the fourteenth and fifteenth embodiments, the decision procedure for the threshold and the received power which are measured in the mobile station in the first and third embodiments is performed in the base station. Also in the second, fourth to thirteenth embodiment, the mobile station may inform the base station of the measured received power or the movement speed, and the decision procedures between various kinds of thresholds and them may be performed in the base station.

Furthermore, in the first to fifteenth embodiments, in the case where the mobile station in cellular system A measures the received power of the perch channel in cellular system A during the communication, the mobile station in cellular system A repeatedly measures the received power of the perch channel in cellular system B during the communication until the termination of the communication. However, the present invention is not limited to this, the received power may be measured in a certain time interval which is previously determined or in a time interval every report to the mobile station is sent, which is performed by the base station. Or, the received power may be measured in a time interval which is determined according to a movement speed of the mobile station so that the received power is measured in a short time interval in proportion to the movement speed of the mobile station which is estimated by the mobile station or the base station. The received power may be measured when the mobile station measures the received power of the perch channel of cellular system A and the received power changes in a predetermined rate. As described above, various ways are conceived. With any way, the present invention can be implemented without any trouble.

Furthermore, in the first to fifteenth embodiments, one channel in a frequency band used in cellular system A is set as a carrier frequency adjacent to a frequency band of a down or uplink channel used in cellular system B. The present invention is not limited to this. The present invention can be applied to the case where a plurality of channels are set as an adjacent carrier frequency.

Moreover, in the first to fifteenth embodiments, when a mobile station measures a received power of transmitting signals of a base station belonging to another cellular system, the mobile station measures the received power of the perch channel. The present invention is not limited to this. The present invention is similarly applied to the case where a received power of a signal other than that signal in another cellular system is measured, as long as this signal is the one that is transmitted by the base station. It is satisfactory that the mobile station may measure all received powers in a frequency band of a carrier frequency which the base station belonging to another cellular system uses for transmitting. The mobile station may measure a received power of a control channel other than the perch channel.

While preferred embodiments according to the present invention have been described using specific terms, such description is for illustrative purposes only, and it is to be understood that changes and variations may be made without departing from the spirit or scope of the following claims.

What is claimed is:

1. A method of preventing interference of adjacent frequencies in a cellular system comprising the steps of:
   at the mobile station:
      measuring received power of the carrier frequencies directed in the carrier selection rule information at the time the mobile station starts communication with the base station;
      reporting the measurement result to the base station using a non-adjacent carrier frequency that is not adjacent to the carrier frequency paired with the measured carrier frequency;
   at the base station:
      receiving the measurement result from the mobile station;
      selecting a non-adjacent carrier frequency if the measured received power is larger than a threshold value and selecting an available carrier frequency if the measured received power is equal to or smaller than the threshold value;
      sending a call-setup direction, and informing the mobile station of the selected carrier frequency;
   at the mobile station:
      starting communication using the selected carrier frequency;
      measuring received power of carrier frequencies as directed in the carrier selection rule information at a certain time interval, and reporting the measurement result to the base station;
   at the base station:
      receiving the measurement result from the mobile station;
      selecting a non-adjacent carrier frequency, and informing the mobile station of an inter-frequency handover direction, if the measured received power is larger than the threshold value and the mobile station is using an adjacent carrier frequency that is adjacent to the carrier frequencies paired with the measured carrier frequencies; and
   at the mobile station:
      starting inter-frequency handover to the selected carrier frequency.

2. A method of preventing interference of adjacent frequencies wherein first and second cellular systems, each comprising a plurality of base stations and at least one mobile station utilizing frequency bands adjacent to each other for an uplink channel are provided in a same service area, and a signal for the uplink channel used by a mobile station of the first cellular system may cause interference of adjacent frequencies to a base station of the second cellular system, said method comprising the steps of:
   at said mobile station of said first cellular system:
      measuring a received power of each of a plurality of carrier frequencies as directed in measurement information; and
      estimating a speed with which said mobile station is on the move, said step of estimating a speed including the steps of obtaining a median of a received power of a perch channel transmitted from the base station, and counting the number of times that the value of said received power crosses said median for a certain period of time; and at the base station and the mobile station of said first cellular system:
  if an estimated movement speed is larger than a threshold speed, using a carrier frequency that is not adjacent to the carrier frequency used when the estimated movement speed is larger than a threshold speed;
wherein the first and the second cellular systems use CDMA (Code Division Multiple Access).

3. A method of preventing interference of adjacent frequencies wherein first and second cellular systems, each comprising a plurality of base stations and at least one mobile station utilizing frequency bands adjacent to each other for an uplink channel are provided in a same service area, and a signal for the uplink channel used by a mobile station of the first cellular system may cause interference of adjacent frequencies to a base station of the second cellular system, said method comprising the steps of:
  at the mobile station of said first cellular system:
    using, preferentially, a carrier frequency that is not adjacent to a carrier frequency of the uplink channel used by the second cellular system when a signal for the downlink channel is continuously received;
    measuring a received power of signals transmitted from a base station of the second cellular system when a signal of the downlink channel is intermittently received; and
  at the base station and the mobile station of said first cellular system:
    if the measured value is larger than a threshold value, using a carrier frequency that is not adjacent to that of said second cellular system as a carrier frequency of an uplink channel.

4. A method of preventing interference of adjacent frequencies wherein two cellular systems using a CDMA (code division multiple access) method comprising a plurality of base stations and at least one mobile station utilizing frequency bands adjacent to each other for an uplink channel are provided in a same service area, and signal for the uplink channel used by a mobile station of one cellular system may cause interference of adjacent frequencies to a base station of the other cellular system, said method comprising the steps of:
  at the mobile station of said one cellular system:
    measuring a received power of signals transmitted from the base station of the other cellular system;
    reporting the information about the measurement result to the base station of said one cellular system using a non-adjacent carrier frequency that is not adjacent to the carrier frequency paired with the measurement carrier frequency; and
  at the base station and the mobile station of said one cellular system:
    if the measured value is larger than a threshold value, using a carrier frequency that is not adjacent to that of said other cellular system as a carrier frequency of an uplink channel.

5. A method of preventing interference of adjacent frequencies in a cellular system comprising the steps of:
  at a mobile station:
    measuring received power of carrier frequencies as directed in measurement information, and reporting information about the measurement result to a base station;
  at the base station:
    receiving information about the measurement result from the mobile station;
    selecting a non-adjacent carrier frequency, and informing the mobile station of an inter-frequency handover direction, if the measured received power is larger than a threshold value and the mobile station is using an adjacent carrier frequency that is adjacent to the carrier frequencies paired with the measured carrier frequencies; and
  at the mobile station:
    starting inter-frequency handover to the selected carrier frequency.

6. A cellular system comprising:
  a plurality of base stations; and
  at least one mobile station for establishing an uplink channel and a downlink channel with one or more base stations to communicate therewith, measuring a received power of each of a plurality of carrier frequencies as directed in measurement information estimating a movement speed and if an estimated movement speed is larger than a threshold speed, using a carrier frequency that is not adjacent to the carrier frequency used when the estimated movement speed is larger than a threshold speed, said mobile station obtaining a median of a received power of a perch channel transmitted from the base station, and counting the number of times that the value of said received power crosses said median for a certain period of time, thereby estimating the movement speed;
  wherein said cellular system uses CDMA (Code Division Multiple Access).

7. A cellular system comprising:
  a plurality of base stations; and
  at least one mobile station for establishing an uplink channel and a downlink channel with one or more base stations to communicate therewith, using a carrier frequency not adjacent to a carrier frequency of another cellular system, preferentially at a time of receiving the downlink channel continuously, as a carrier frequency of an uplink channel, measuring a received power of each of a plurality of carrier frequencies as directed in measurement information at a time of receiving the downlink channel intermittently, and if a measure value of received power is larger than a threshold value, using a carrier frequency that is not adjacent to the carrier frequency having said measure value of received power.

* * * * *